(12) United States Patent
Hayamizu et al.

(10) Patent No.: US 10,885,030 B2
(45) Date of Patent: Jan. 5, 2021

(54) DATABASE MANAGEMENT SYSTEM AND COMPUTER SYSTEM HAVING FIRST AND SECOND QUERY EXECUTION PARTS WHICH EXECUTE DATABASE OPERATIONS IN PARALLEL

(71) Applicants: Hitachi, Ltd., Tokyo (JP); The University of Tokyo, Tokyo (JP)

(72) Inventors: Yuto Hayamizu, Tokyo (JP); Kazuo Goda, Tokyo (JP); Masaru Kitsuregawa, Tokyo (JP); Nobuo Kawamura, Tokyo (JP)

(73) Assignees: HITACHI, LTD., Tokyo (JP); THE UNIVERSITY OF TOKYO, Tokyo (JP)

( * ) Notice: Subject to any disclaimer, the term of this patent is extended or adjusted under 35 U.S.C. 154(b) by 746 days.

(21) Appl. No.: 14/900,686

(22) PCT Filed: Aug. 29, 2013

(86) PCT No.: PCT/JP2013/073181
§ 371 (c)(1),
(2) Date: Dec. 22, 2015

(87) PCT Pub. No.: WO2015/029187
PCT Pub. Date: Mar. 5, 2015

(65) Prior Publication Data
US 2016/0232206 A1  Aug. 11, 2016

(51) Int. Cl.
*G06F 16/2453* (2019.01)
*G06F 16/21* (2019.01)
*G06F 16/2455* (2019.01)

(52) U.S. Cl.
CPC ........ *G06F 16/24542* (2019.01); *G06F 16/21* (2019.01); *G06F 16/2455* (2019.01); *G06F 16/24552* (2019.01)

(58) Field of Classification Search
CPC ........ G06F 17/30463; G06F 17/30289; G06F 17/30477; G06F 17/3048
(Continued)

(56) References Cited

U.S. PATENT DOCUMENTS

2003/0120709 A1* 6/2003 Pulsipher ............. G06F 9/4881
                                                             718/106
2004/0117398 A1   6/2004 Idei et al.
(Continued)

FOREIGN PATENT DOCUMENTS

JP    2004-192292 A   7/2004
JP       4611830 B2   1/2011

OTHER PUBLICATIONS

International Search Report of PCT/JP2013/073181.
(Continued)

*Primary Examiner* — Alicia M Antoine
(74) *Attorney, Agent, or Firm* — Mattingly & Malur, PC

(57) ABSTRACT

A second query execution part is added to a database management system comprising a first query execution part configured to execute a query based on a query execution plan of a query to a database and to return a query execution result to the query issuance source and a buffer management part configured to read a data of a read request from the database to store the data into the buffer and to provide the data to an issuance source of the read request if data of a read request has not been stored in a buffer in the case where the read request of data is received and configured to read data of a read request from the buffer and to provide the data to a issuance source of the read request if data of a read request has been stored in the buffer.

18 Claims, 19 Drawing Sheets

(58) Field of Classification Search
USPC .......................................................... 707/718
See application file for complete search history.

(56) References Cited

U.S. PATENT DOCUMENTS

| | | |
|---|---|---|
| 2007/0022100 A1 | 1/2007 | Kitsuregawa et al. |
| 2010/0082599 A1* | 4/2010 | Graefe .............. G06F 17/30306 707/713 |
| 2010/0211577 A1* | 8/2010 | Shimizu ............ G06F 17/30454 707/752 |
| 2010/0293156 A1 | 11/2010 | Tanaka et al. |
| 2011/0313999 A1* | 12/2011 | Bruno ............... G06F 17/30454 707/718 |
| 2013/0346988 A1* | 12/2013 | Bruno .................. G06F 9/5066 718/102 |
| 2014/0156636 A1* | 6/2014 | Bellamkonda .... G06F 16/24556 707/718 |
| 2014/0172823 A1* | 6/2014 | Kaminsky ......... G06F 17/30442 707/718 |
| 2014/0317084 A1* | 10/2014 | Chaudhry ........... G06F 17/3048 707/713 |
| 2014/0380322 A1* | 12/2014 | Ailamaki .............. G06F 9/4843 718/102 |

OTHER PUBLICATIONS

Extended European Search Report received in corresponding European Application No. 13892093.9 dated Feb. 6, 2017.

Bouganim, L. et al., "Memory-Adaptive Scheduling for Large Query Execution", URL: http://www-smis.inria.fr/dataFiles/BKV98a.pdf, Nov. 7, 1998, pp. 105-115.

* cited by examiner

Fig. 2

Definition of Table and definition of index

Part Table:
CREATE TABLE PART ( c1 INTEGER, c2 INTEGER )
Part index:
CREATE INDEX IDX_PART ON PART ( c1 )
Lineitem Table:
CREATE TABLE LINEITEM ( c3 INTEGER, c4 CHAR(10) )
Lineitem index:
CREATE INDEX IDX_LINEITEM ON LINEITEM ( c3 )

Fig. 3

Part Table

| c1 | c2 |
|---|---|
| 10 | id11 |
| ⋮ | ⋮ |
| 130 | id131 |
| 130 | id132 |
| 130 | id133 |
| ⋮ | ⋮ |
| 300 | id301 |

Fig. 4

Lineitem Table

| c3 | c4 |
|---|---|
| id11 | A |
| ⋮ | |
| id131 | D |
| id131 | E |
| id132 | A |
| id132 | B |
| id132 | C |
| id133 | F |
| id133 | G |
| ⋮ | |
| id301 | Z |

Fig. 5

Query

```
SELECT    c1, c4
  FROM    part, lineitem
  WHERE   c1 = 130   and c2 = c3
```

Fig. 9

Statistical information  427

General statistical information table

| Table | Column | Statistical value |
|---|---|---|
| Part | c1 | Frequency distribution. Class 0 to 999: Number of records 20,000  Class 1000 to 1999: Number of records 50,000 ... |
| Lineitem | c3 | Cardinality: 1,000,000 |
| Lineitem | - | Total number of records: 6,000,000 |
| .. | .. | .. |

Acceleration part state management information — 429

Executing execution instance table — 1101

| Execution instance ID | Database operation ID | Execution context | Parent execution instance ID | Predicted order number |
|---|---|---|---|---|
| #4 | OP4 | Sibling #: 1 | #3 | 4 |
| #10 | OP4 | Sibling #: 1 | #9 | 10 |
| .. | .. | .. | .. | .. |

Queuing execution instance table — 1102

| Execution instance ID | Database operation ID | Execution context | Parent execution instance ID | Predicted order number |
|---|---|---|---|---|
| #6 | OP4 | Sibling #: 2 | #3 | 6 |
| #12 | OP4 | Sibling #: 2 | #9 | 12 |
| #14 | OP4 | Sibling #: 3 | #9 | 14 |
| .. | .. | .. | .. | .. |

Executed execution instance table — 1103

| Execution instance ID | Database operation ID | Execution context | Parent execution instance ID | Predicted order number |
|---|---|---|---|---|
| #1 | OP1 | - | - | 1 |
| #2 | OP2 | Sibling #: 1 | #1 | 2 |
| #8 | OP2 | Sibling #: 2 | #1 | 8 |
| #3 | OP3 | Sibling #: 1 | #2 | 3 |
| #9 | OP3 | Sibling #: 1 | #8 | 9 |
| .. | .. | .. | .. | .. |

Fig. 20

Database buffer management information
~550

Database buffer management table

| Database page ID | Access frequency | Acceleration part store flag | Query execution part provision flag |
|---|---|---|---|
| P1 | xxx | 1 | 1 |
| P2 | yyy | 1 | 0 |
| ⋮ | | ⋮ | ⋮ |

Fig. 21

Statistical information 427

Query specific statistical information table 2101

| Table | Column | Statistical value |
|---|---|---|
| Part | c1 | Number of corresponded records under condition c1=130: 7 |
| Lineitem | c3 | Average join rate under condition Part.c2=Lineitem.c3: 3 |
| .. | .. | .. |

2111　2112　2113

901

General statistical information table

DATABASE MANAGEMENT SYSTEM AND COMPUTER SYSTEM HAVING FIRST AND SECOND QUERY EXECUTION PARTS WHICH EXECUTE DATABASE OPERATIONS IN PARALLEL

TECHNICAL FIELD

The present invention relates to a data input/output, for example, a data processing technology and a database management technology.

BACKGROUND ART

For strategic activities of business enterprises, the utilization of a large amount of business data in business enterprises is absolutely necessary. For the utilization of the business data, a database management system has been devised to store the business data in a database and to carry out an analytical processing for the database.

A database management system receives a query to a database, executes the query, and outputs the execution result. At this time in general, the database management system sequentially executes one or more database operations that are required for a query execution procedure in a predetermined order.

More specifically, in the case where a database management system executes one query, after an execution of a database operation is completed, an execution of another database operation is started. In the case where it is necessary to read data from a database in order to execute a database operation, a read request of data is issued to the database, and another database operation cannot be executed until data is read from the database in response to the read request. Consequently, an execution of a query is suspended due to the read. As a result, a time required for an execution of one query becomes longer in some cases.

For which a technology that is disclosed in Patent Literature 1 is known. In the case where a database management system that is disclosed in Patent Literature 1 executes a query, the database management system creates a task for every read request of data that is required for an execution of a database operation. The database management system executes database operations in parallel by executing tasks that has been created as described above in parallel, and issues data read requests in a multiple way. By this configuration, a time required for an execution of one query is shortened in some cases.

CITATION LIST

Patent Literature

[PTL 1]
Japanese Patent Publication No. 4611830

SUMMARY OF INVENTION

Technical Problem

For a database server in general, a database management system of a type for sequentially executing one or more database operations in a predetermined order is adopted. It is thought that modifying an existing database management system of such a type to be a database management system of a type that is provided with a function for dynamically creating a task according to Patent Literature 1 is one means to shorten a time required for an execution of one query. However, such a modification is not easy since the modification is accompanied by a fundamental modification of a database management system and it is necessary to rewrite program codes to a large extent in many cases.

Such a problem may exist for not only a database management system but also a system for a data input/output such as another computer program or a computer system that requires data read.

An object of the present invention is to shorten a time required for an execution of one processing request without fundamentally modifying an existing system. For example, an object of the present invention is to shorten a time required for an execution of one query without fundamentally modifying an existing database management system.

Solution to Problem

A database management system is provided with a query reception part, a query execution plan creation part, a first query execution part, a second query execution part, and a buffer management part. For example, the database management system is a computer program and configures the query reception part, the query execution plan creation part, the first query execution part, the second query execution part, and the buffer management part for a computer by being executed by the computer.

The query reception part is configured to receive a query to the database from a query issuance source. The query execution plan creation part is configured to create a query execution plan that includes information indicating one or more database operations that are required for an execution of the received query and an execution procedure of the one or more database operations based on the received query. The first and second query execution parts are respectively configured to execute the query by executing database operations based on the created query execution plan and obtain a result of the execution. At this time, the first and second query execution parts can respectively issue a read request of data that is required for an execution of a database operation to the buffer management part. The buffer management part is configured to read a data from a buffer and to provide the data to a query execution part that is an issuance source of the read request if the data of the read request has already been stored in the buffer in the case where the read request of data is received from any one of the first and second query execution parts for example. In the case where the data of the read request has not been stored in the buffer, the buffer management part is configured to issue the read request of the data to the database, store the data read in response to the read request to the buffer, and provide the data to a query execution part that is an issuance source of the read request.

The first query execution part of the first and second query execution parts is configured to respond the execution result of the query to the query issuance source. In other words, the first query execution part is configured to respond the execution result of the query to the query issuance source, and the second query execution part is not configured to respond the execution result of the query to the query issuance source.

In the case where the buffer management part receives a read request of data from the first query execution part and in the case where the read request of the data has been received from the second query execution part and thereby the data has been read from the database and stored in the buffer, the buffer management part can read the data from the buffer and to provide the data to the first query execution part.

In this case, the first query execution part can be a query execution part for sequentially executing one or more database operations in a predetermined order. The second query execution part can be a query execution part for dynamically creating tasks according to Patent Literature 1.

In the case where the first query execution part requires data for an execution of a database operation in an execution of a query and in the case where the data has already been stored in the buffer by the buffer management part according to a read request from the second query execution part, the first query execution part can read the data from the buffer and it is not necessary that the first query execution part newly reads the data from the database. That is, a time required for the execution of the query by the first query execution part can be shortened by the second query execution part in some cases. Consequently, in accordance with the present invention, it is expected that a time required for an execution of one query can be shortened without fundamentally modifying an existing database management system that is provided with the first query execution part.

BRIEF DESCRIPTION OF DRAWINGS

FIG. 2 is a view showing a definition of a Table and an index of a database in accordance with Embodiment 1.

FIG. 3 is a view showing a Part Table in accordance with Embodiment 1.

FIG. 4 is a view showing a Lineitem Table in accordance with Embodiment 1.

FIG. 5 is a view showing a query in accordance with Embodiment 1.

FIG. 9 is a view showing a configuration of statistical information in accordance with Embodiment 1.

FIG. 11 is a view showing a configuration of acceleration part state management information in accordance with Embodiment 1.

FIG. 20 is a view showing a configuration of database buffer management information in accordance with Embodiment 2.

FIG. 21 is a view showing a configuration of statistical information in accordance with Embodiment 3.

DESCRIPTION OF EMBODIMENTS

Some embodiments will be described with reference to drawings in the following. An issuance source of a query to a database management system can be an internal computer program of the database management system or an external computer program. For example, the query issuance source can be a computer program (for example, an application program) that is executed in a database server that is provided with a database management system or a computer program (for example, an application program) that is executed in an apparatus such as a client computer coupled to a database server.

Embodiment 1

Figure 1:
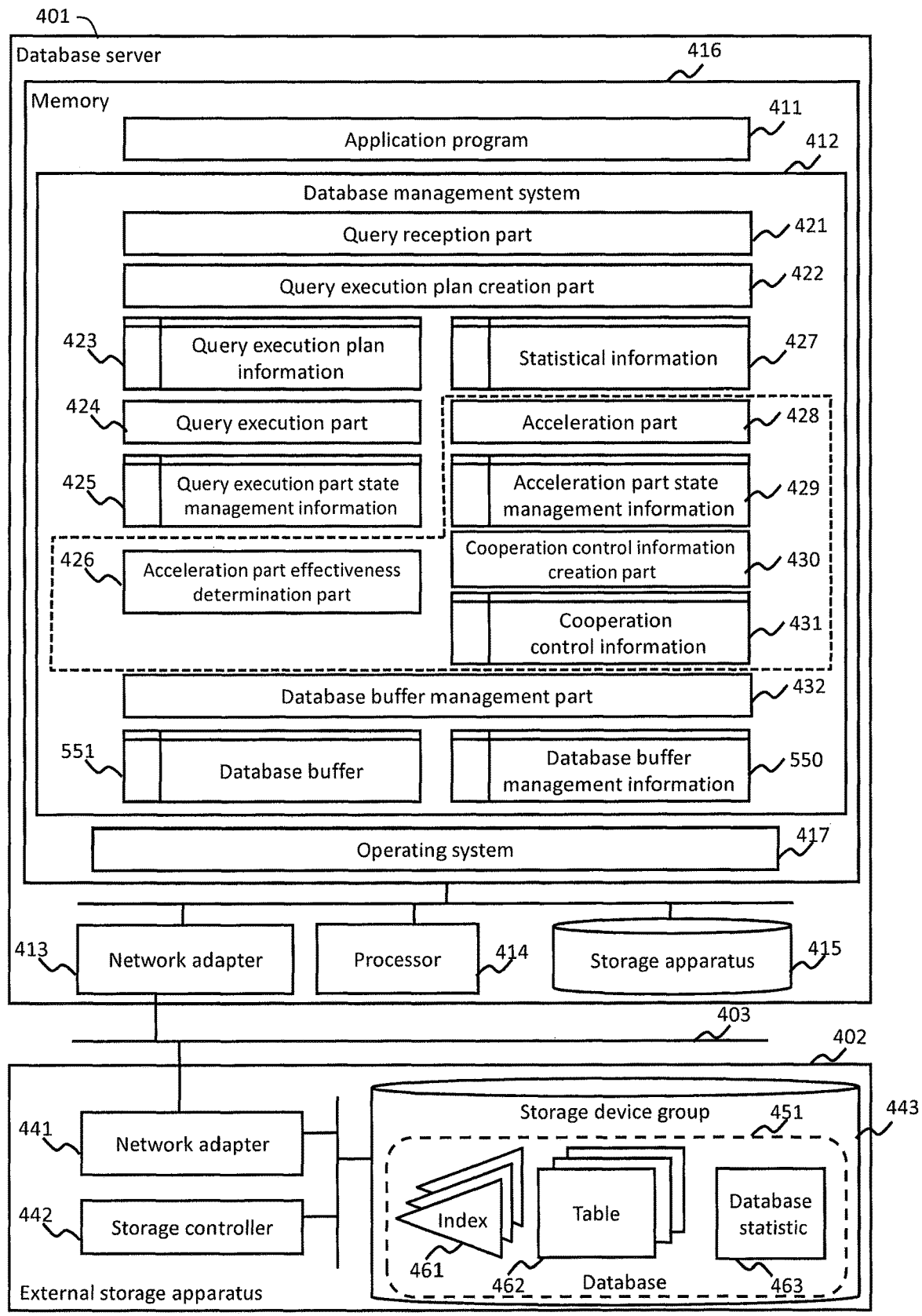
FIG. 1 is a view showing a configuration of a computer system in accordance with Embodiment 1.

FIG. 1 is a view showing a configuration of a computer system in accordance with Embodiment 1.

A database server 401 is a computer and can be a personal computer, a workstation, or a mainframe for example, or can be a virtual computer that is configured by a virtualization program for the computer. The database server 401 is provided with a network adapter 413, a memory 416, a storage apparatus 415, and a processor 414 coupled to those components. The processor 414 is a microprocessor for example and executes computer programs. The computer programs that are executed by the processor 414 are an operating system 417, a database management system 412, and an application program 411 that issues a query to the database management system 412 for example. The memory 416 is a volatile DRAM (Dynamic Random-Access Memory) for example and temporarily stores a program that is executed by the processor 414 and data that is used by the program. The storage apparatus 415 is a non-volatile magnetic disk or a flash memory for example and stores a program and data that is used by the program. The network adapter 413 couples the database server 401 to a communication network 403. The application program 411 can be one that is operated by another computer (not shown) that is coupled to the network adapter 413, not to the database server 401. The processor 414 can be a component that is included in a control device coupled to the network adapter 413 and the memory 416 for example. The control device can include a dedicated hardware circuit such as a circuit that codes or decodes data in addition to the processor 414.

The database server 401 can be provided with plural components of any one of the processor 414, the memory 416, the storage apparatus 415, and the network adapter 413 in order to improve performance and redundancy. The database server 401 can be provided with an input device (not shown) such as a keyboard and a pointing device and an output device (not shown) such as a liquid crystal display. An input device and an output device can be coupled to the processor 414. An input device and an output device can be configured in an integrated manner.

The database server 401 issues an input/output request to an external storage apparatus 402 that stores a database 451 to the operating system 417 in order to read data from the database 451 or to write data to the database 451 in the case where the database management system 412 executes a query that has been issued from the application program 411. The operating system 417 receives the input/output request and issues an input/output request to the external storage apparatus 402.

The external storage apparatus 402 is an apparatus that is provided with a storage device group 443 including a plurality of storage devices, and is a disk array apparatus for example, however, the external storage apparatus 402 can be a single storage device as substitute for the disk array apparatus. The external storage apparatus 402 stores a database 451 that is managed by the database management system 412 included in the database server 401. However, the external storage apparatus 402 can store a program in addition to data of the database 451. The external storage apparatus 402 receives an input/output request from the database server 401, reads/writes data according to the input/output request, and returns the result to the database server 401.

The external storage apparatus 402 is provided with, in addition to the storage device group 443, a network adapter 441 and a storage controller 442 coupled to those components.

The network adapter 441 couples the external storage apparatus 402 to a communication network 403, and the external storage apparatus 402 is coupled to the database server 401 via the network. As a communication protocol via the communication network 403, a fiber channel (FC), an SCSI (Small Computer System Interface), or a TCP/IP (Transmission Control Protocol/Internet Protocol) can be adopted for example. In the case where the fiber channel or the SCSI is adopted for example, the network adapter 413 of the database server 401 and the network adapter 441 of the external storage apparatus 402 are referred to as a host bus adapter in some cases.

Storage devices included in the storage device group 443 are devices that are provided with non-volatile storage media and magnetic disk drives, flash memory drives, or other semiconductor memory drives for example. The storage device group 443 is configured in accordance with a RAID (Redundant Array of Independent Disks) mechanism and can store data in a predetermined RAID level. A logical storage device (such as a logical unit, a logical volume, and a file system volume) based on a storage space of the storage device group 443 can be provided to the database server 401, and the database 451 can be stored on the logical storage device.

The storage controller 442 includes a memory and a processor for example, and reads or writes data with the storage device group 443 storing the database 451 in response to an input/output request from the database server 401. In the case where the storage controller 442 receives a read request of data from the database server 401 for example, the storage controller 442 reads data from the storage device group 443 according to the request and returns the read data to the database server 401.

The external storage apparatus 402 can be provided with a plurality of components such as the storage controller 442 in order to improve a performance and redundancy.

The database management system 412 manages the database 451. The database 451 includes one or more Tables 462, and can further include one or more indexes 461. The Table 462 is a set of one or more records, and the record is configured by one or more columns. The index 461 is a data structure that is created for one or more columns of Tables 462. The index 461 is for speeding up an access to the Tables 462 under a selection condition in which the index 461 includes columns as the target of the index 461. For example, the Table 462 is a data structure that holds information for identifying a record that includes a value in the Table 462 for every value of a column of a target. As a data structure, a B-tree is used for example. As information for identifying a record, a physical address or a logical row ID is used in some cases. Moreover, the database 451 can include a database statistic 463. The database statistic 463 includes information related to data included in the database such as information indicating the number of entries of the index 461, information indicating the number of records of the Tables 462, a maximum value, an average value and a minimum value of a value for every column, and a value distribution for every column.

The database management system 412 includes a query reception part 421, a query execution plan creation part 422, a query execution plan information 423, statistical information 427, a query execution part 424 (an example of a first query execution part), query execution part state management information 425, an acceleration part effectiveness determination part 426, an acceleration part 428 (an example of a second query execution part), acceleration part state management information 429, a cooperation control information creation part 430, cooperation control information 431, a database buffer management part 432, a database buffer 551, and database buffer management information 550.

The query reception part 421 receives a query that is issued by the application program 411. A query is described by using a structured query language (SQL) for example.

The query execution plan creation part 422 creates, based on the query that has been received by the query reception part 421, a query execution plan that includes one or more database operations required for an execution of the query. The query execution plan is information that includes one or more database operations and a relationship of an execution order of the database operations for example, and is stored into the query execution plan information 423. The query execution plan is expressed as a tree structure in which a database operation is a node and a relationship of an execution order of the database operations is an edge in some cases. The query execution plan creation part 422 can use the statistical information 427 in the case where the query execution plan is created.

The query execution part 424 executes a query that has been received by the query reception part 421 according to the query execution plan that has been created by the query execution plan creation part 422, and returns the execution result to the application program 411. In this case, the query execution part 424 executes database operations for the query execution plan in a predetermined order according to a technology that is adopted by an existing database management system 412, and returns the execution result of the query to the application program 411 that is a query issuance source. In this case, the query execution part 424 issues a read request of data required for an execution of the database operation to the database buffer management part 432, and executes the database operation by using the data that has been returned by the database buffer management part 432 in response to the read request. In the case where the query execution part 424 executes a query, the query execution part 424 can store the execution state into the query execution part state management information 425 to be used.

The acceleration part 428 executes a query that has been received by the query reception part 421 according to the query execution plan that has been created by the query execution plan creation part 422 similarly. In this case, the acceleration part 428 can be a query execution part to which a technology disclosed in Patent Literature 1 is applied. More specifically, the acceleration part 428 (a) creates a task for executing a database operation, (b) issues a read request of data required for an execution of a database operation corresponding to the task to the database buffer management part 432 by executing the created task, (c) in the case where it is necessary to execute another database operation based on an execution result of the database operation corresponding to the task that has been executed in (b), newly creates one or more tasks for executing the another database operation, and (d) executes (b) and (c) for each of the one or more tasks that have been newly created. The acceleration part 428 can execute one or more tasks that have been created as described above in parallel. In the case where two or more executable tasks exist, the acceleration part 428 can execute at least two tasks of the two or more tasks in parallel. In the case where the acceleration part 428 executes a query, the acceleration part 428 can store the execution state into the acceleration part state management information 429 to be used. Moreover, the acceleration part 428 can decide an executable task based on the query execution part state management information 425 and the cooperation control information 431. The acceleration part 428 issues a read request of data required for an execution of a database operation corresponding to the task to the database buffer management part 432, and executes the database operation by using data that has been returned by the database buffer management part 432 in response to the request. In the above, the acceleration part 428 can execute a plurality of database operations by one task. Furthermore, the acceleration part 428 can execute the next database operation for the same task without newly creating a task every time executing a database operation. As an implementation of a task, a process or a kernel thread that are implemented by the operating system 417 and a user thread that is implemented by a library can be used for example. In the above, unlike the query execution part 424, it is not necessary that the acceleration part 428 returns the execution result to the application program 411, and it is not always necessary that the acceleration part 428 executes the entire of the query.

The database buffer management part 432 manages a database buffer 551 for temporarily storing data of the database 451. The database buffer 551 is configured on the memory 416 and includes one or more database pages. The number of database pages that are included in the database buffer 551 is limited to a predetermined number in some cases. The database buffer management part 432 reads data of the database 451 to the database buffer 551 and writes data that has been stored in the database buffer 551 to the database 451. In the case where the database buffer management part 432 receives a read request of data from the query execution part 424 or the acceleration part 428 and data of the read request has already been stored in the database buffer 551, the database buffer management part 432 returns the data to the query execution part 424 or the acceleration part 428 that is the issuance source of the read request. On the other hand, in the case where data of the read request has not been stored in the database buffer 551, the database buffer management part 432 reads the data from the database 451, stores the read data into the database buffer 551, and returns the data to the query execution part 424 or the acceleration part 428 that is the issuance source of the read request. The methods for requesting the database buffer management part 432 to read data by the query execution part 424 and the acceleration part 428 can be identical or similar. In the case where the database buffer management part 432 manages the database 451, the database buffer management part 432 can store the information for a management into the database buffer management information 550 to be used.

It can be said that the database management system 412 is a database management system in which program modules shown in a broken line frame of FIG. 1 such as the acceleration part 428, the acceleration part effectiveness determination part 426, and the cooperation control information creation part 430 are mainly added (for example, added-in) to an existing database management system. An existing database management system is mainly configured by the query execution part 424, the query execution plan creation part 422, and the database buffer management part 432. The database management system 412 in accordance with the present embodiment is mainly provided furthermore with the acceleration part 428, the acceleration part effectiveness determination part 426, and the cooperation control information creation part 430, thereby shortening a time required for an execution of one query in some cases. In other words, it is expected that a time required for an execution of one query can be shortened without a fundamental modification of the database management system 412.

The query reception part 421, the query execution plan creation part 422, the query execution part 424, the acceleration part 428, the acceleration part effectiveness determination part 426, the cooperation control information creation part 430, and the database buffer management part 432 that are described above are implemented by an execution of the database management system 412 by the processor 414. At least part of the processing that is executed by at least one of those components can be implemented by hardware. The computer programs such as the database management system 412 can be installed from a program source to the database server 401. The program source can be a storage medium that can be read by the database server 401 for example.

The configuration of the database management system 412 shown in FIG. 1 is just one example. For example, some component can be divided into a plurality of components, or a plurality of components can be integrated to one component.

FIG. 2 is a view showing a definition of a Table 462 and an index 461 of a database in accordance with Embodiment 1.

The database 451 is provided with a Part Table including a column c1 that stores a value of an integer type and a column c2 that stores a value of an integer type and a Lineitem Table including a column c3 that stores a value of an integer type and a column c4 that stores a value of a character type as Tables 462 for example. Moreover, the database 451 is provided with an index related to the Part Table based on values of the column c1 (Part index) and an index related to the Lineitem Table based on values of the column c3 (Lineitem index) as indexes 461.

FIG. 3 is a view showing a Part Table in accordance with Embodiment 1.

Each record of the Part Table of the database 451 is configured by a value of the column c1 and a value of the column c2.

FIG. 4 is a view showing a Lineitem Table in accordance with Embodiment 1.

Each record of the Lineitem Table of the database 451 is configured by a value of the column c3 and a value of the column c4.

FIG. 5 is a view showing a query in accordance with Embodiment 1.

A query shown in FIG. 5 is an example of a query to the database 451 shown in FIGS. 2 to 4. A query shown in FIG. 5 represents that the value of the column c1 and the value of the column c4 are extracted from the Part Table and the Lineitem Table for each one in which a value of the column c1 is "130" and a value of the column c2 and a value of the column c3 are identical to each other.

Figure 6:
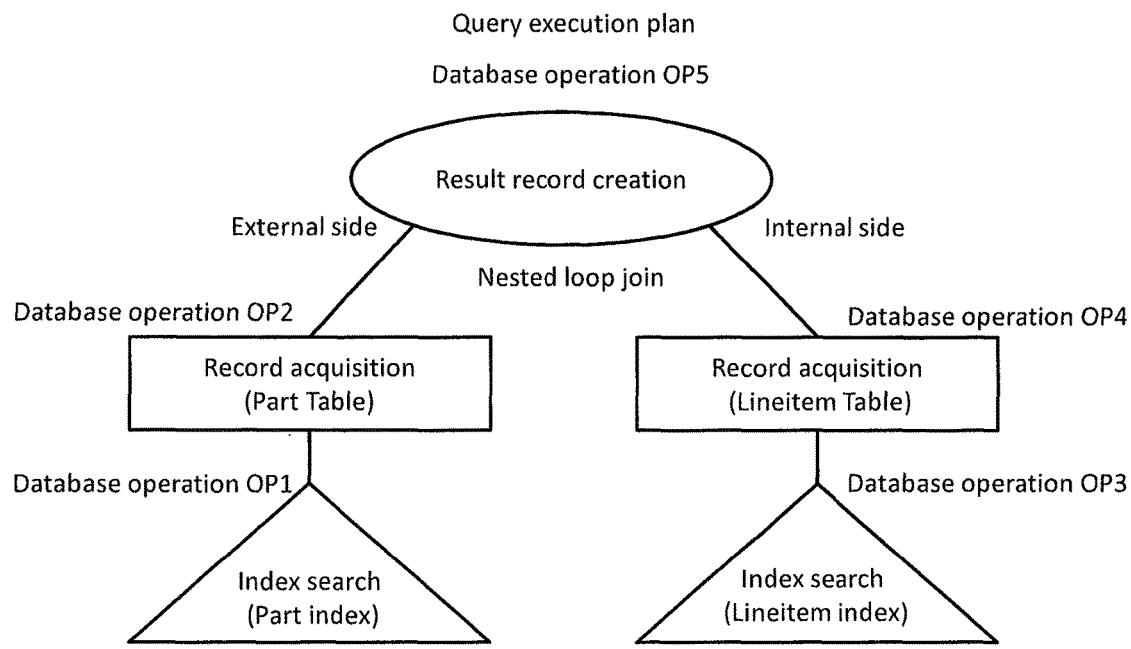
FIG. 6 is a view showing a query execution plan in accordance with Embodiment 1.

FIG. 6 is a view showing a query execution plan in accordance with Embodiment 1.

The query execution plan shown in FIG. 6 is an example of a query execution plan that is created by the query execution plan creation part 422 in the case where the database management system 412 receives a query shown in FIG. 5.

The query execution plan shown in FIG. 6 means a nested loop index join of two Tables that are the Part Table being an external Table and the Lineitem Table being an internal Table. More specifically, the query execution plan is composed of a database operation OP1 for executing the index retrieval with a Part index, a database operation OP2 for acquiring a record from the Part Table based on the result of the index retrieval, a database operation OP3 for executing the index retrieval with a Lineitem index based on the result of the record acquisition, a database operation OP4 for acquiring a record from the Lineitem Table based on the result of the index retrieval, and a database operation OP5 for creating a result record that is output based on the result of the record acquisition.

Figure 7:
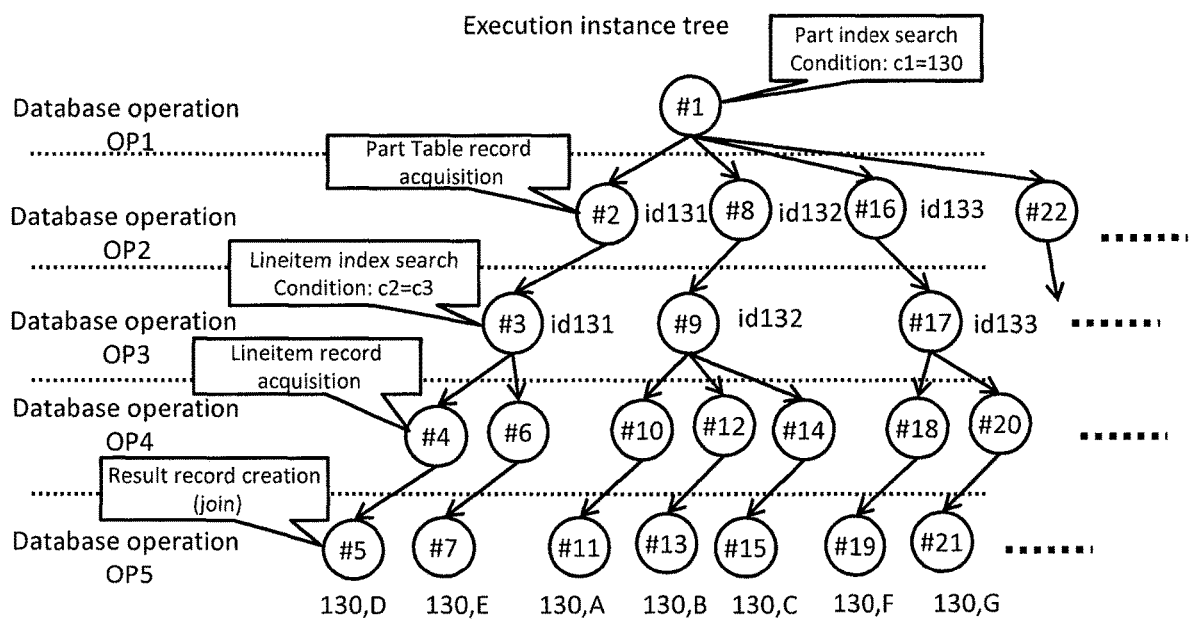
FIG. 7 is a view showing an execution instance tree of a query execution in accordance with Embodiment 1.

FIG. 7 is a view showing an execution instance tree of a query execution in accordance with Embodiment 1.

In the first place, a concept of an execution instance will be described. In the case where the query execution part 424 executes a query for example, the query execution part 424 executes one database operation and, based on the result, executes another database operation in some cases. In this case, a database operation of the latter stage is executed to each of a plurality of records that have been obtained as a result of an execution of a database operation of the former stage in some cases. In other words, a database operation of the latter stage is executed plural times, and the same database operation is executed to different input values (that can be a value of a state) for each of the executions. Such each execution of a database operation is referred to as "an execution instance", and an input value in this case is referred to as "an execution context".

In the case where the query execution part 424 executes a query shown in FIG. 5 by a query execution plan shown in FIG. 6, an execution of a database operation is drawn as shown in FIG. 7. FIG. 7 is a graph in which an execution instance is a node and a subordinate relationship between execution instances is an edge. Since a database operation OP1 is for executing the index retrieval by Part index under the condition of c1=130, this is one execution instance (#1). As a result of an execution of the database operation OP1, a reference to a record |130|id131| of a Part Table that matches c1=130 is obtained, and a database operation OP2 for acquiring the record is called. In FIG. 7, an execution of the database operation OP2 for acquiring the record |130|id131| is one execution instance (#2). Moreover, as a result of an execution of the database operation OP2, a database operation OP3 for executing the index retrieval by Lineitem index under the condition of c2=c3=id131 is called. In FIG. 7, this is one execution instance (#3). As a result of an execution of the database operation OP3, a reference to a record |id131|D| of a Lineitem Table that matches c3=id131 is obtained, and a database operation OP4 for acquiring the record is called. In FIG. 7, an execution of the database operation OP4 for acquiring the record |id131|D| is one execution instance (#4). As a result, a database operation OP5 is further called and executed, and a result record |130|D| is created. In FIG. 7, this is one execution instance (#5). As a result of an execution of the execution instance (#3) after that, a reference to a record |id131|E| of a Lineitem Table that matches c3=id131 is obtained, and a database operation OP4 for further acquiring the record from the execution instance (#3) is called. In FIG. 7, an execution of the database operation OP4 for acquiring the record |id131|D| is one execution instance (#6). As a result, a database operation OP5 is further called and executed, and a result record |130|E| is created. As a result of an execution of the execution instance (#1) after that, since a reference to a record |130|id132| of a Part Table that matches c1=130 is obtained, and a database operation OP2 for acquiring the record is called. In FIG. 7, an execution of the database operation OP2 for acquiring the record |130|id132| is one execution instance (#8). After that, the next database operation is further called and executed based on an execution result of a database operation similarly. That is, another execution instance is created from an execution instance and is executed. This configuration can be indicated like a tree structure of FIG. 7 in some cases. Consequently, the present figure is referred to as "an execution instance tree" in the present embodiment.

The query execution part 424 sequentially executes database operations in a predetermined order. Consequently, an execution of a query by the query execution part 424 is corresponded to that an execution instance tree of FIG. 7 is started from the execution instance (#1) of a root and all database operations are executed in a predetermined order. For example, the predetermined order may be an order of (#1)→(#2)→(#3)→(#4)→(#5)→(#6)→(#7)→(#8)→ . . . . In this case, an order number indicating an order in which the execution instances are executed is thought for each of the execution instances. For example, a value obtained by incrementing a natural number in an order of an execution of an execution instance by the query execution part 424 can be allocated to an order number of the execution instances. In the above-mentioned example for example, the order number of the execution instance (#1) is 1, the order number of the execution instance (#2) is 2, the order number of the execution instance (#3) is 3, and the other order numbers can be allocated similarly below.

On the other hand, the acceleration part 428 executes a query shown in FIG. 5 in accordance with a query execution plan shown in FIG. 6 similarly to the query execution part 424 basically. Consequently, a query execution by the acceleration part 428 can be represented by an execution instance tree basically identical to that of the query execution part 424. However, since the acceleration part 428 executes a query while dynamically creating a task, an order of an execution of an execution instance is different from that of the query execution part 424. More specifically, although the execution instance (#1) of a root is started with, there is a possibility of that the order is not necessarily the same as the prescribed order. In an example of FIG. 7 for example, as a result of an execution of the database operation OP1 for the execution instance (#1), the execution instance (#2) is executed at first in a query execution procedure by the query execution part 424. However, the execution instance (#2)

may be executed at first or the execution instance (#8) may be followed at first in a query execution procedure by the acceleration part 428. Moreover, there is no reproducibility for an execution order of an execution instance by the acceleration part 428 in some cases. For example, in the case where a query is executed at first, even if the execution instance (#8) is executed at first after the execution instance (#1), there is a possibility of that the execution instance (#16) is followed at first after the execution instance (#1) in the case where the same query is executed next.

In the present embodiment, in the case where the acceleration part 428 executes a query, data that has been read from the database 451 is stored into the database buffer 551 in some cases. In the case where the query execution part 424 executes the same query in parallel, there is a possibility of causing the case in which data is read from the database buffer 551 without newly reading data from the database 451. By this configuration, there is a possibility of that a time required for a query execution procedure by the query execution part 424 is shortened. To improve an effect of such time shortening, after the acceleration part 428 stores data into the database buffer 551, it is preferable that the query execution part 424 acquires the same data from the database buffer 551. In other words, it is preferable that the acceleration part 428 earlier executes the same execution instance for a query execution procedure. Moreover, since a capacity of the database buffer 551 is finite, after the acceleration part 428 stores data into the database buffer 551, it is preferable that the query execution part 424 acquires the same data from the database buffer 551 in a certain time or a certain step. In other words, it is preferable that the acceleration part 428 earlier executes the same execution instance for a query execution procedure and the query execution part 424 executes the same execution instance without much delay. Put it all together, since an execution order of an execution instance by the query execution part 424 is prescribed, it is expected that the acceleration part 428 improves an effect of shortening a time required for an execution of a query by the query execution part 424 by adjusting an execution order of an execution instance in reference to an execution order of an execution instance by the query execution part 424. A specific procedure will be described later.

An execution instance tree has been described while using a tree structure as an example. However, the execution instance tree can be a graph. For example, it is also possible to create and edge from a plurality of execution instances to single execution instance. This means that all of execution results of the database operation for the former execution instance are obtained and the database operation for the latter execution instance is called.

Figure 8:
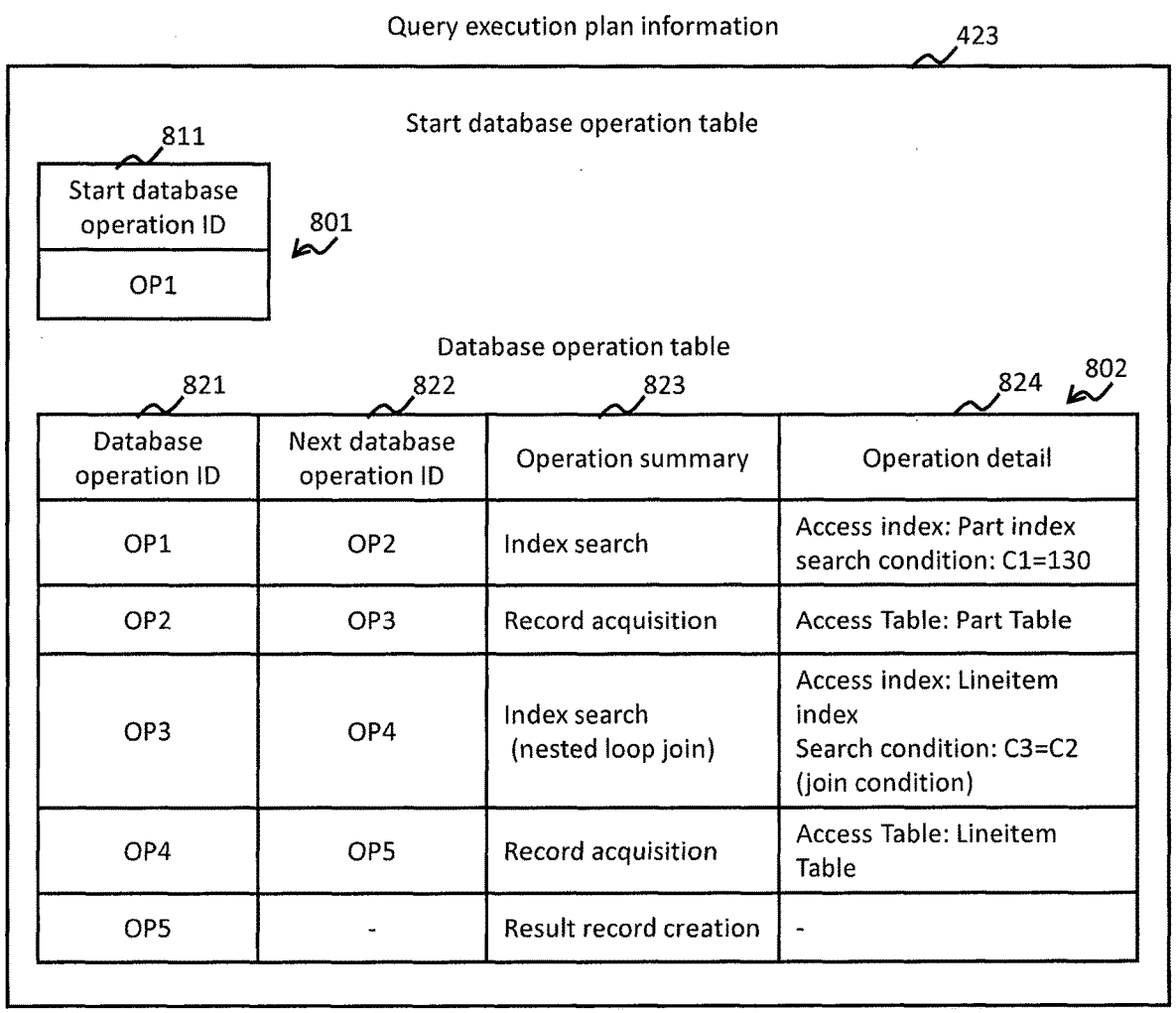
FIG. 8 is a view showing a configuration of query execution plan information in accordance with Embodiment 1.

FIG. 8 is a view showing a configuration of the query execution plan information 423 in accordance with Embodiment 1.

The query execution plan information 423 is information on the memory 416 of the query execution plan shown in FIG. 6. The query execution plan information 423 is composed of a start database operation table 801 and a database operation table 802. The start database operation table 801 represents a database operation that is executed at first for an execution of a query. The database operation table 802 is a list of database operations that are executed for an execution of a query.

The start database operation table 801 is provided with one record, and is provided with a start database operation ID 811 as an attribute. The start database operation ID 811 represents a database operation ID that indicates a database operation that is executed at first for an execution of a query.

The database operation table 802 is provided with a record for every database operation, and is provided with a database operation ID 821, a next database operation ID 822, a database operation summary 823, and a database operation detail 824 as attributes. The database operation ID 821 is an ID for uniquely identifying a database operation in a query execution plan. The next database operation ID 822 is a database operation ID of the next database operation that is called by a database operation after the execution of the database operation. The database operation summary 823 indicates a type of a processing that is executed by the database operation. The database operation detail 824 indicates the detail of a processing that is executed by the database operation.

FIG. 9 is a view showing a configuration of the statistical information 427 in accordance with Embodiment 1.

The statistical information 427 includes information related to data that is included in the database 451, and is information on the memory 416 of the whole or a part of the database statistic 463 that is included in the database 451 for example. The statistical information 427 can be configured based on further information that is included in the database 451. The statistical information 427 includes a general statistical information table 901. The general statistical information table 901 includes information related to a Table 462 or an index 461 that is included in the database 451, for example, information indicating the number of entries of the index 461, information indicating the number of records of Table 462, a maximum value, an average value, and a minimum value of a value for every column, and a value distribution for every column.

The general statistical information table 901 is provided with a record for every statistical item, and is provided with a Table 911, a column 912, and a statistical value 913 as attributes. The Table 911 indicates a Table related to a statistical item. The column 912 indicates a column related to a statistical item. However, in the case where the statistical item is not related to a particular column, the column 912 is "-". The statistical value 913 indicates a specific value of a type of a statistic. In FIG. 9, a first statistical item represents a frequency distribution related to a c1 column of the Part Table, and represents that the number of records in which a value of c1 is in the range of 0 to 999 is 20000 and the number of records in which a value of c1 is in the range of 1000 to 1999 is 50000. A second statistical item represents that cardinality related to a c3 column of the Lineitem Table is 1000000. A third statistical item represents that the total number of records of the Lineitem Table is 6000000.

Figure 10:
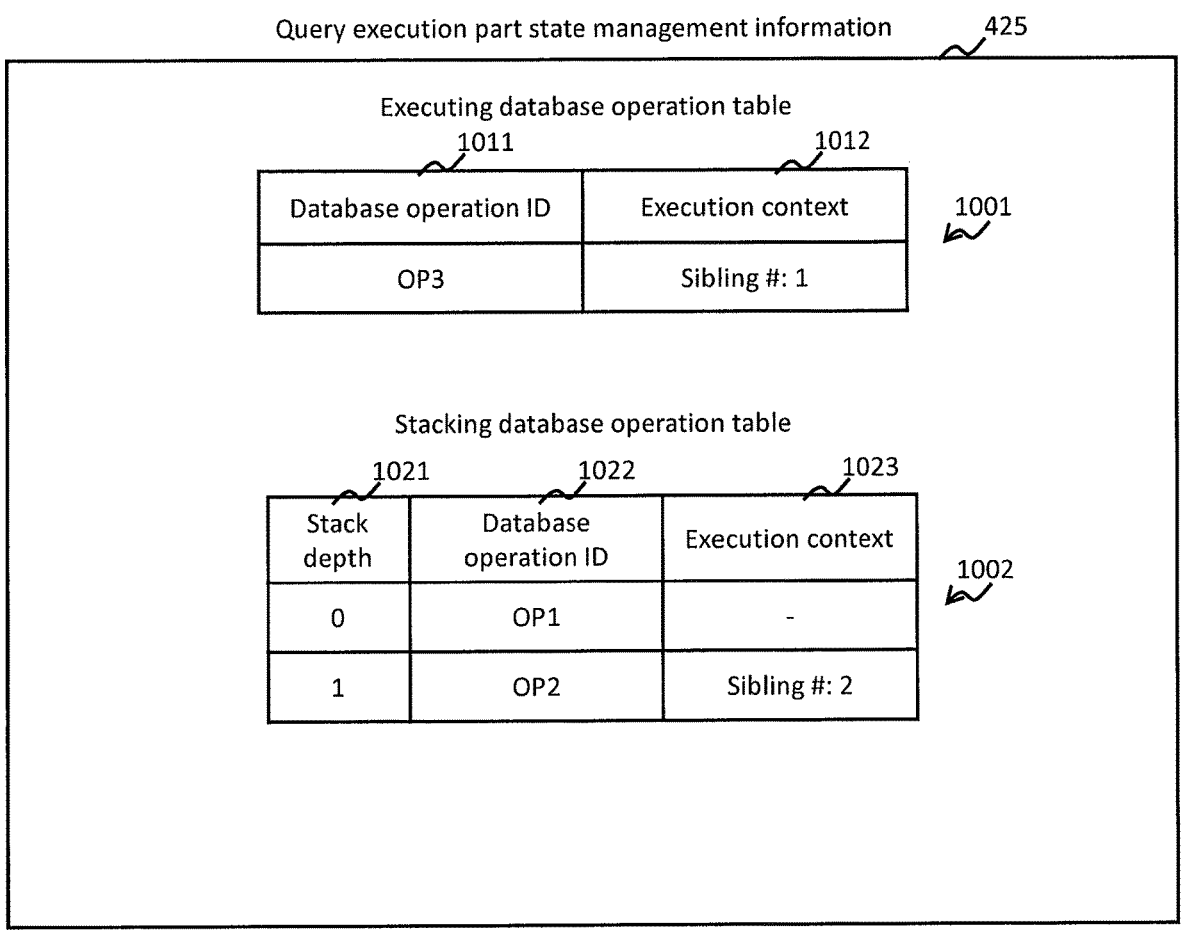
FIG. 10 is a view showing a configuration of query execution part state management information in accordance with Embodiment 1.

FIG. 10 is a view showing a configuration of the query execution part state management information 425 in accordance with Embodiment 1.

The query execution part state management information 425 is provided with an executing database operation table 1001 and a stacking database operation table 1002. The executing database operation table 1001 manages execution information of a database operation that is being executed at the moment for the query execution part 424. In other words, the executing database operation table 1001 manages information of an execution instance that is being executed at the moment for the query execution part 424. The stacking database operation table 1002 manages execution information of a database operation that has been stacked for the query execution part 424. In other words, the stacking database operation table 1002 manages information of an execution instance that has been stacked thus far for the query execution part 424.

Since the query execution part 424 sequentially executes a database operation, the number of database operations that is being executed is 1, that is, the number of execution instances that is being executed is 1. The executing database operation table 1001 is provided with one record always. The executing database operation table 1001 is provided with a database operation ID 1011 and an execution context 1012 as attributes. The database operation ID 1011 is a database operation ID that indicates a database operation that is being executed at the moment. The execution context 1012 is an execution context of the database operation. In the example of FIG. 10 for example, the query execution part 424 is executing a database operation OP3 at the moment, and the database operation is provided with information of sibling #: 1 as an execution context, meaning a calling of a first database operation for a parent database operation.

The stacking database operation table 1002 is provided with a record for every execution of a database operation that has been stacked, that is, every execution instance that has been stacked, and is provided with a stack depth 1021, a database operation ID 1022, and an execution context 1023 as attributes. The stack depth 1021 indicates an order of a stack. The database operation ID 1022 is a database operation ID that indicates a database operation that has been stacked. The execution context 1023 is an execution context of the database operation that has been stacked. In the example of FIG. 10 for example, the query execution part 424 stacks an execution of a database operation OP1 at first. Since the database operation OP1 is a start database operation, an execution context is not shown here. In the example of FIG. 10 moreover, the query execution part 424 stacks an execution of a database operation OP2 in the next place. The database operation is provided with information of sibling #: 2 as an execution context, meaning a calling of a second database operation for a parent database operation OP1.

FIG. 11 is a view showing a configuration of the acceleration part state management information 429 in accordance with Embodiment 1.

The acceleration part state management information 429 is provided with an executing execution instance table 1101, a queuing execution instance table 1102, and an executed execution instance table 1103. The executing execution instance table 1101 manages information of an execution instance that is being executed at the moment for the acceleration part 428. The queuing execution instance table 1102 manages information of an execution instance in an execution wait state that is queued at the moment for the acceleration part 428. The executed execution instance table 1103 manages information of an execution instance in an executed state that has already been executed for the acceleration part 428.

The executing execution instance table 1101 is provided with a record for every execution instance that is being executed, and is provided with an execution instance ID 1111, a database operation ID 1112, an execution context 1113, a parent execution instance ID 1114, and a predicted order number 1115 as attributes. The execution instance ID 1111 is an execution instance ID that indicates an execution instance that is being executed at the moment. The database operation ID 1112 is a database operation ID that indicates a database operation that is executed for the execution instance. The execution context 1113 is an execution context in the case where a database operation is executed for the execution instance. The parent execution instance ID 1114 is an execution instance ID that indicates a parent execution instance that has created the execution instance. The predicted order number 1115 is an order number that has been predicted by a procedure described later for the execution instance. In the example of FIG. 11 for example, the acceleration part 428 is executing at least an execution instance of #4 and an execution instance of #10 in parallel. Moreover, the execution instance of #4 executes the database operation OP4, an execution context in this case is sibling #: 1 and a creation of a first execution instance for a parent execution instance #3, and an order number that has been predicted by a procedure described later is 4.

The queuing execution instance table 1102 is provided with a record for every execution instance in an execution wait state that has been queued, and is provided with an execution instance ID 1121, a database operation ID 1122, an execution context 1123, a parent execution instance ID 1124, and a predicted order number 1125 as attributes. The execution instance ID 1121 is an execution instance ID that indicates an execution instance in an execution wait state that has been queued. The database operation ID 1122 is a database operation ID that indicates a database operation that is executed for the execution instance. The execution context 1123 is an execution context in the case where a database operation is executed for the execution instance. The parent execution instance ID 1124 is an execution instance ID that indicates a parent execution instance that has created the execution instance. The predicted order number 1125 is an order number that has been predicted by a procedure described later for the execution instance. In the example of FIG. 11 for example, the acceleration part 428 is queuing at least an execution instance of #6, an execution instance of #12, and an execution instance of #14. Moreover, the execution instance of #6 executes the database operation OP4, an execution context in this case is sibling #: 2 and a creation of a second execution instance for a parent execution instance #3, and an order number that has been predicted by a procedure described later is 6.

The executed execution instance table 1103 is provided with a record for every execution instance in an executed state, and is provided with an execution instance ID 1131, a database operation ID 1132, an execution context 1133, a parent execution instance ID 1134, and a predicted order number 1135 as attributes. The execution instance ID 1131 is an execution instance ID that indicates an execution instance in an executed state. The database operation ID 1132 is a database operation ID that indicates a database operation that is executed for the execution instance. The execution context 1133 is an execution context in the case where a database operation is executed for the execution instance. The parent execution instance ID 1134 is an execution instance ID that indicates a parent execution instance that has created the execution instance. The predicted order number 1135 is an order number that has been predicted by a procedure described later for the execution instance. In the example of FIG. 11 for example, the acceleration part 428 has already executed at least the execution instances of #1, #2, #8, #3, and #9. Moreover, the execution instance of #1 executes the database operation OP1, a parent execution instance does not exist since the database operation is a start database operation, an execution context is not recorded in particular, and an order number that has been predicted by a procedure described later is 1.

Figure 12:
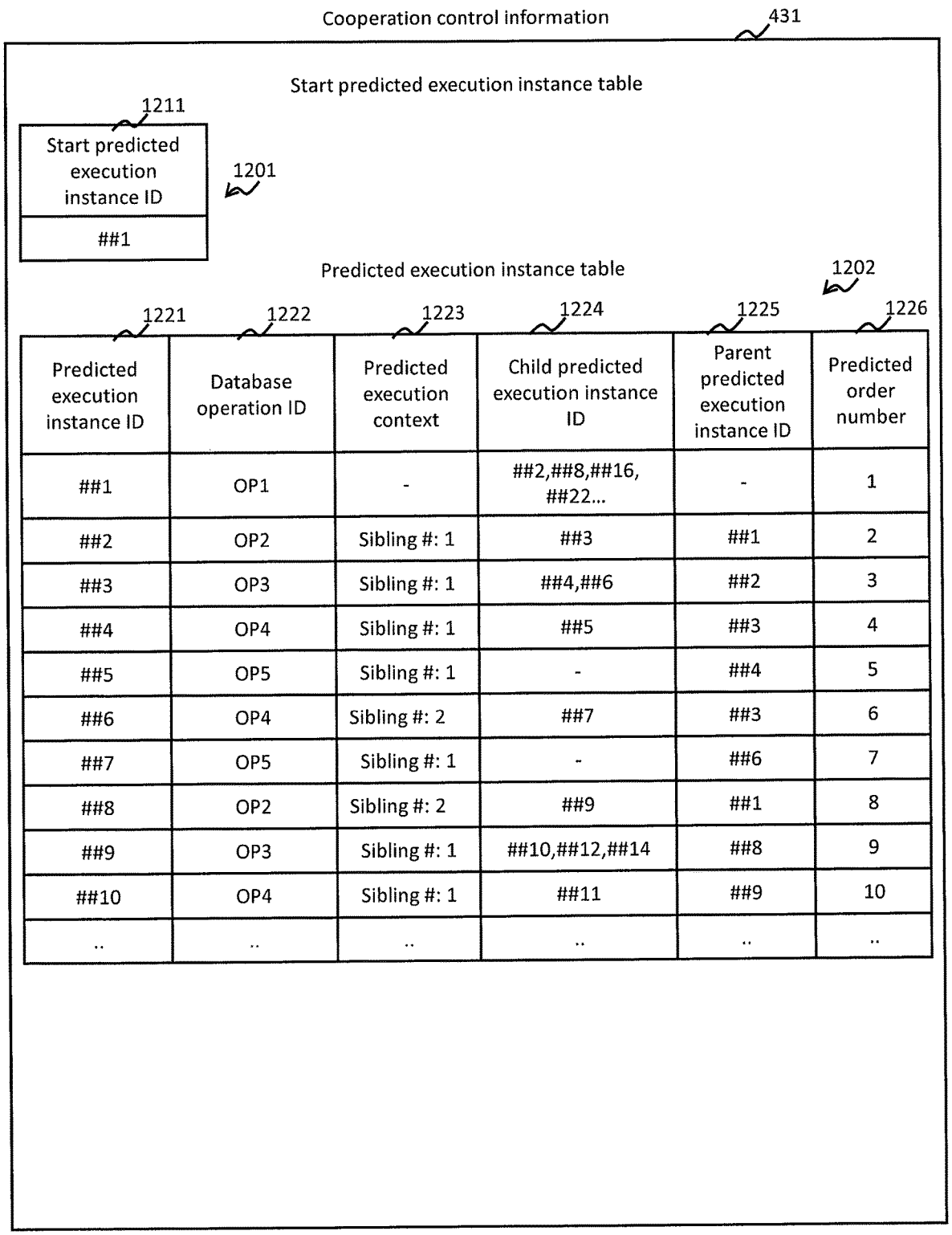
FIG. 12 is a view showing a configuration of cooperation control information in accordance with Embodiment 1.

FIG. 12 is a view showing a configuration of the cooperation control information 431 in accordance with Embodiment 1.

The cooperation control information 431 is for the acceleration part 428 to adjust an execution order of an execution instance in reference to an execution order of an execution instance by the query execution part 424 by a procedure described later for the purpose of improving an effect of shortening a time required for an execution of a query by the query execution part 424. The whole picture of execution instances required for an execution of a query, such as an execution instance tree shown in FIG. 7, is clarified only after an execution of a query is completed. It is impossible to comprehend the whole picture thereof before an execution of a query or on the way of an execution of a query. However, by using the statistical information 427 related to the database 451 and the information of a query execution plan, it is possible to predict the whole picture of execution instances although the whole picture of execution instances is not completely precise. By adjusting an execution order of an execution instance by the acceleration part 428 using the prediction information, it is expected that an effect of shortening a time required for an execution of a query by the query execution part 424 is improved. In the present embodiment, the cooperation control information creation part 430 predicts the whole picture of execution instances and stores the predicted information into the memory 416 as the cooperation control information 431 by using the statistical information 427 related to the database and the information of a query execution plan by a procedure described later. Moreover, by a procedure described later, an execution order of an execution instance by the acceleration part 428 is adjusted using the cooperation control information 431.

The cooperation control information 431 is provided with a start predicted execution instance table 1201 and a predicted execution instance table 1202. The start predicted execution instance table 1201 indicates an execution instance that is predicted to be executed at first by the acceleration part 428 for an execution of a query. The predicted execution instance table 1202 is a list of an execution instance that is predicted to be executed by the acceleration part 428.

The start predicted execution instance table 1201 is provided with one record, and is provided with a start predicted execution instance ID 1211 as an attribute. The start predicted execution instance ID 1211 indicates an execution instance ID that indicates an execution instance that is predicted to be executed at first by the acceleration part 428 for an execution of a query.

The predicted execution instance table 1202 is provided with a record for every execution instance that is predicted to be executed by the acceleration part 428, and is provided with a predicted execution instance ID 1221, a database operation ID 1222, a predicted execution context 1223, a child predicted execution instance ID 1224, a parent predicted execution instance ID 1225, and a predicted order number 1226 as attributes. The predicted execution instance ID 1221 is an execution instance ID that is predicted to be executed by the acceleration part 428. The database operation ID 1222 is a database operation ID that indicates a database operation that is executed for the predicted execution instance. The predicted execution context 1223 is an execution context that is predicted in the case where a database operation is executed for the predicted execution instance. The child predicted execution instance ID 1224 is a predicted execution instance ID that indicates a predicted execution instance that is predicted to create the predicted execution instance. The parent predicted execution instance ID 1225 is a predicted execution instance ID that indicates a predicted execution instance that is predicted to create the predicted execution instance. The predicted order number 1226 is an order number of an execution in which a predicted execution instance is predicted to be executed by the query execution part 424. In the example of FIG. 12 for example, it is predicted that the execution instances listed as ##1, ##2, and ##3 are executed. A predicted execution instance ##1 is created at first and executes the database operation OP1. Consequently, there is not an execution context and a parent execution instance in particular. The predicted order number is 1. Moreover, it is predicted that the predicted execution instances ##2, ##8, ##16, and ##22 are created. The predicted execution instances ##2 executes the database operation OP2, and is created as sibling #: 1, that is, at first, as an execution context from the predicted execution instance #1. The predicted order number is 2. Furthermore, it is predicted that the predicted execution instances ##3 is created.

A variety of processing that is executed in the present embodiment will be described with reference to drawings.

Figure 13:
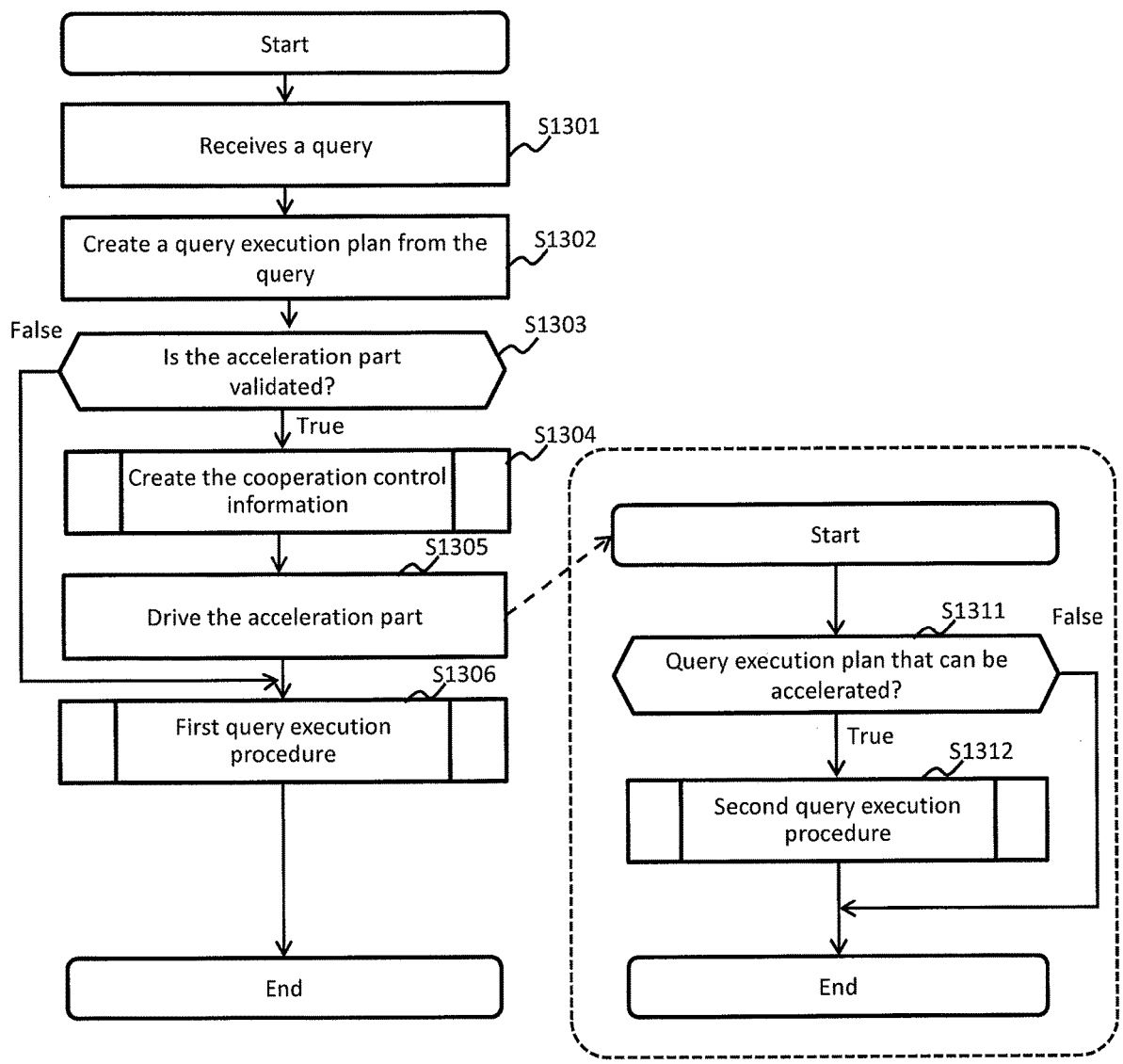
FIG. 13 is a view showing a procedure for receiving a query, creating a query execution plan, and executing a query in accordance with Embodiment 1.

FIG. 13 illustrates a procedure for receiving a query in accordance with Embodiment 1, creating a query execution plan, and executing a query. FIG. 13 illustrates the procedure in the case where one query is received. In the case where two or more queries are received, the data management system 412 can execute the procedure shown in FIG. 13 for each of the two or more queries in parallel, or can sequentially execute the procedure shown in FIG. 13. In this case, the information shown in FIGS. 8 to 12 can be configured for every query. This configuration can be executed by configuring an attribute for identifying a query for each table for example.

In the S1301, the query reception part 421 receives a query that is issued by the application program 411, and stores the query into the memory 416. The query can be described by the structured query language (SQL) for example.

Subsequently in the S1302, the query execution plan creation part 422 creates a query execution plan from the query that has been received by the query reception part 421 based on the database statistic 463 of the database 451 or the statistical information 427 on the memory 416, and stores the query execution plan information 423 into the memory 416 as information that indicates the query execution plan that has been created. In this case, the query execution plan creation part 422 can create a candidate of one or more query execution plans, calculate a cost for every candidate, and select a candidate of one query execution plan as a query execution plan by a standard in which a cost is minimum for example. Moreover, a query execution plan can be created based on an instruction that is included in the description of the query that has been received in the S1301, such as an SQL hint.

Subsequently in the S1303, the acceleration part effectiveness determination part 426 determines whether or not the acceleration part 428 is valid for the database management system 412. More specifically in the S1303, the acceleration part effectiveness determination part 426 determines whether or not the acceleration part 428 is included in the database management system 412 and is operated effectively. This can be determined based on the configuration information such as a configuration parameter of the database management system 412 for example. Moreover, it is also possible that the configuration information is stored in storage (such as the storage apparatus 415 and the external storage apparatus 402) that can be referred to from the database management system 412, the acceleration part 428 is valid in the case where the configuration information includes the predetermined instruction, and the acceleration part 428 is not valid in the case where the configuration information does not include the predetermined instruction.

In the case where a result of the determination of the acceleration part effectiveness determination part 426 is positive, the S1304 and the S1305 are executed subsequently and the S1306 is then executed. In the case where a result of the determination of the acceleration part effectiveness determination part 426 is negative, the S1306 is executed.

In the S1304, the cooperation control information creation part 430 creates the cooperation control information 431 based on the query execution plan that has been created by the query execution plan creation part 422. The details of the procedure will be described later.

Subsequently in the S1305, the acceleration part effectiveness determination part 426 drives the acceleration part 428 with the query execution plan that has been created by the query execution plan creation part 422 as an input. By this configuration, in parallel to the procedure of the S1306 by the query execution part 424, the acceleration part 428 executes the procedures from the S1311 to the S1312 described on the right side of FIG. 13.

In the S1306, the query execution part 424 executes the query that has been received by the first query execution procedure based on the query execution plan that has been created by the query execution plan creation part 422. The details of the procedure will be described later. The query execution part 424 completes an execution of a query by completing the first query execution procedure, and returns the result that has been obtained by the execution of the query to the application program 411 that is a query issuance source. In the first query execution procedure, the query execution part 424 reads data from the database buffer 551. Consequently, in the first query execution procedure, the query execution part 424 can use data that has already been read to the database buffer 551 by a second query execution procedure described later. That is, the query execution part 424 can execute a database operation without being accompanied by an input/output to a database in some cases in the first query execution procedure.

In the S1311, the acceleration part 428 determines whether or not the query execution plan that has been input is a query execution plan that can be accelerated. Here, a query execution plan that can be accelerated means a query execution plan in which a time required for a query execution procedure by the first query execution procedure can be shortened by executing the second query execution procedure in parallel based on the query execution plan.

The determination of the S1311 (a determination of whether or not the query execution plan can be accelerated) can be executed by configuring a predetermined condition in which the query execution plan can be accelerated to the database management system 412 and by determining whether or not the query execution plan satisfies the condition. Moreover, determination of whether or not the query execution plan can be accelerated can be executed based on the following standard separately from the above or in addition to the above.

In the S1311, the acceleration part 428 can determine that the query execution plan can be accelerated in the case where an amount of a resource that can be used for an execution of a query by the second query execution procedure satisfies a predetermined condition, and can determine that the query execution plan cannot be accelerated in the case where the amount does not satisfy a predetermined condition. Here, an amount of a resource that can be used can be a capacity of the memory 416 that can be used or a capacity of the database buffer 551.

The determination of the S1311 can be executed based on an instruction that is included in the description of the query that has been received in the S1301, such as an SQL hint. For example, the acceleration part 428 can determine that the query can be accelerated in the case where a predetermined instruction is included in the query that has been received in the S1301, and can determine that the query cannot be accelerated in the case where a predetermined instruction is not included in the query that has been received in the S1301.

The determination of the S1311 can be executed based on a value such as a configuration parameter of the database management system 412. For example, the acceleration part 428 can determine that the query can be accelerated in the case where the configuration information that has been stored in storage (such as a storage apparatus 415 and an external storage apparatus 402) that can be referred to from the database management system 412 includes a predetermined instruction, and can determine that the query cannot be accelerated in the case where the configuration information does not include a predetermined instruction.

In the case where a result of the determination of the S1311 is positive, the acceleration part 428 executes the S1312. In the case where a result of the determination of the S1311 is negative, the acceleration part 428 is terminated.

In the S1312, the acceleration part 428 executes the query that has been received by the second query execution procedure based on the query execution plan that has been created by the query execution plan creation part 422. The details of the procedure will be described later. The acceleration part 428 completes an execution of a query by completing the second query execution procedure. In this case, in the case where the query execution part 424 completes the first query execution procedure even on the way of an execution of the second query execution procedure, the acceleration part 428 can stop and terminate an execution of the second query execution procedure. The acceleration part 428 can determine that the query execution part 424 completes the first query execution procedure by the query execution part state management information 425 for example.

In the second query execution procedure, the acceleration part 428 stores data that has been read from a database into the database buffer 551 in some cases. Consequently, the query execution part 424 can use data that has already been stored into the database buffer 551 by the second query execution procedure in some cases for the first query execution procedure.

A procedure for creating the cooperation control information 431 shown in the S1304 can be executed prior to an execution of the S1311 for the acceleration part 428 or can be executed prior to an execution of the S1306 for the query execution part 424 for example as substitute for the above. In this case, an execution of the S1311 and an execution of the S1306 are executed after a creation of the cooperation control information 431.

Figure 14:
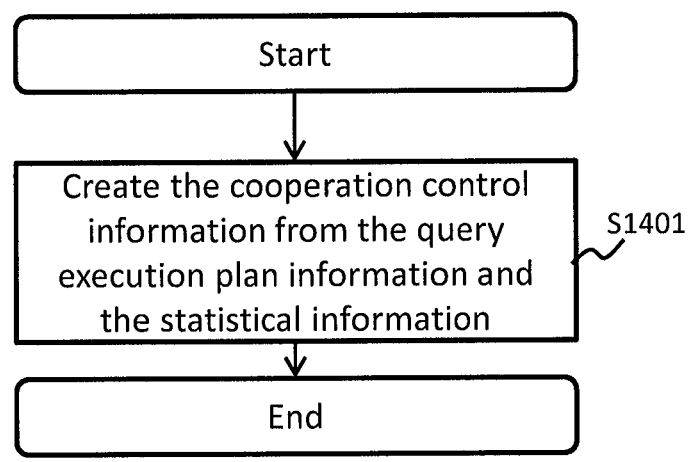
FIG. 14 is a view showing a procedure for creating cooperation control information in accordance with Embodiment 1.

FIG. 14 is a view showing a procedure for creating the cooperation control information 431 in accordance with Embodiment 1. The procedure is corresponded to a procedure of the S1304 of FIG. 13.

In the S1401, the cooperation control information creation part 430 creates the cooperation control information 431 with reference to the query execution plan information 423 and the statistical information 427.

For example, the following describes an example of the general statistical information table 901 of the query execution plan information 423 of FIG. 8 and the statistical information 427 of FIG. 9. The database operation OP1 executes the index retrieval of the Part Table under the condition of c1=130. For a frequency distribution of the Part Table that is included in the statistical information 427, a frequency of the class in the range of 0 to 999 of c1 is 20000. Consequently, it is estimated that the number of records of the Part Table in which c1=130 is satisfied on average is 20,000×1÷1000=20. That is, it is predicted that the database operation OP2 is executed to each of twenty different inputs as a result of an execution of the database operation OP1. The database operation OP2 acquires a record based on a record reference. In this case, since one record is corresponded to one record reference, it is predicted that one database operation OP3 is executed as a result of an execution of each database operation OP2. The database operation OP3 executes the index retrieval of the Lineitem Table under the condition of c2=c3 based on a record that has been acquired from the Part Table. The cardinality to a c3 column of the Lineitem Table that is included in the statistical information 427 is 1000000, and the total number of records is 6000000. Consequently, a record of 6,000,000÷1,000,000=6 is corresponded to one value of c3 on average. Therefore, it is predicted that the database operation OP4 is executed to each of six different inputs as a result of an execution of each database operation OP3. The database operation OP4 acquires a record based on a record reference. In this case, since one record is corresponded to one record reference, it is predicted that one database operation OP5 is executed as a result of an execution of each database operation OP4. In the case where the statistical uniformity is assumed by the above procedure, the following execution instance tree is predicted.

The number of execution instances that are corresponded to the database operation OP1 is 1. This is the execution instance (a predicted execution instance) that is executed at first.

Twenty execution instances are created from the execution instance (the database operation OP2 is executed). In other words, the number of execution instances that are corresponded to the database operation OP2 is 20.

One execution instance is created from each of the execution instance (the database operation OP3 is executed). In other words, the number of execution instances that are corresponded to the database operation OP3 is 20.

Six execution instances are created from each of the execution instance (the database operation OP4 is executed). In other words, the number of execution instances that are corresponded to the database operation OP4 is 120.

One execution instance is created from each of the execution instance (the database operation OP5 is executed). In other words, the number of execution instances that are corresponded to the database operation OP5 is 120.

Such a predicted execution instance tree is stored into the memory 416 by the configuration shown in FIG. 12. A predicted order number can be calculated by following a predicted execution instance based on an execution order of a query for the query execution part 424 starting with a start predicted execution instance on the predicted execution instance tree.

In this case, it is also possible that the cooperation control information creation part 430 refers to the query execution plan information 423 and the statistical information 427, creates the total information of the predicted execution instance tree in advance, and follows the predicted execution instance. In the above example for example, a predicted order number of an execution instance that is corresponded to the database operation OP1 is 1, a predicted order number of an execution instance that is corresponded to the database operation OP2 that is executed at first (that is, sibling #: 1) is 2, and a value is incremented similarly. By this configuration, a predicted order number can be obtained. Moreover, the cooperation control information creation part 430 creates partial information related to a predicted execution instance tree and can calculate the predicted execution instance tree in the case where the cooperation control information 431 is referred to later. In the above example for example, it is predicted that an execution instance that is corresponded to the database operation OP2 creates an execution instance that is corresponded to one database operation OP3 on average, an execution instance that is corresponded to the database operation OP3 creates execution instances that are corresponded to the six database operation OP3 on average, an execution instance that is corresponded to the database operation OP3 creates an execution instance that is corresponded to one database operation OP4 on average, and an execution instance that is corresponded to the database operation OP4 creates an execution instance that is corresponded to one database operation OP5 on average. It is also possible that the cooperation control information creation part 430 stores only the statistical summary information in the memory 416, and in the case where the cooperation control information 431 is referred to later, a predicted order number of an execution instance that is corresponded to the database operation OP2 that is executed secondarily (that is, sibling #: 2) is obtained by a calculation of 2+1+1×6+1×6×1+1=16 by using the information for example.

Figure 15:
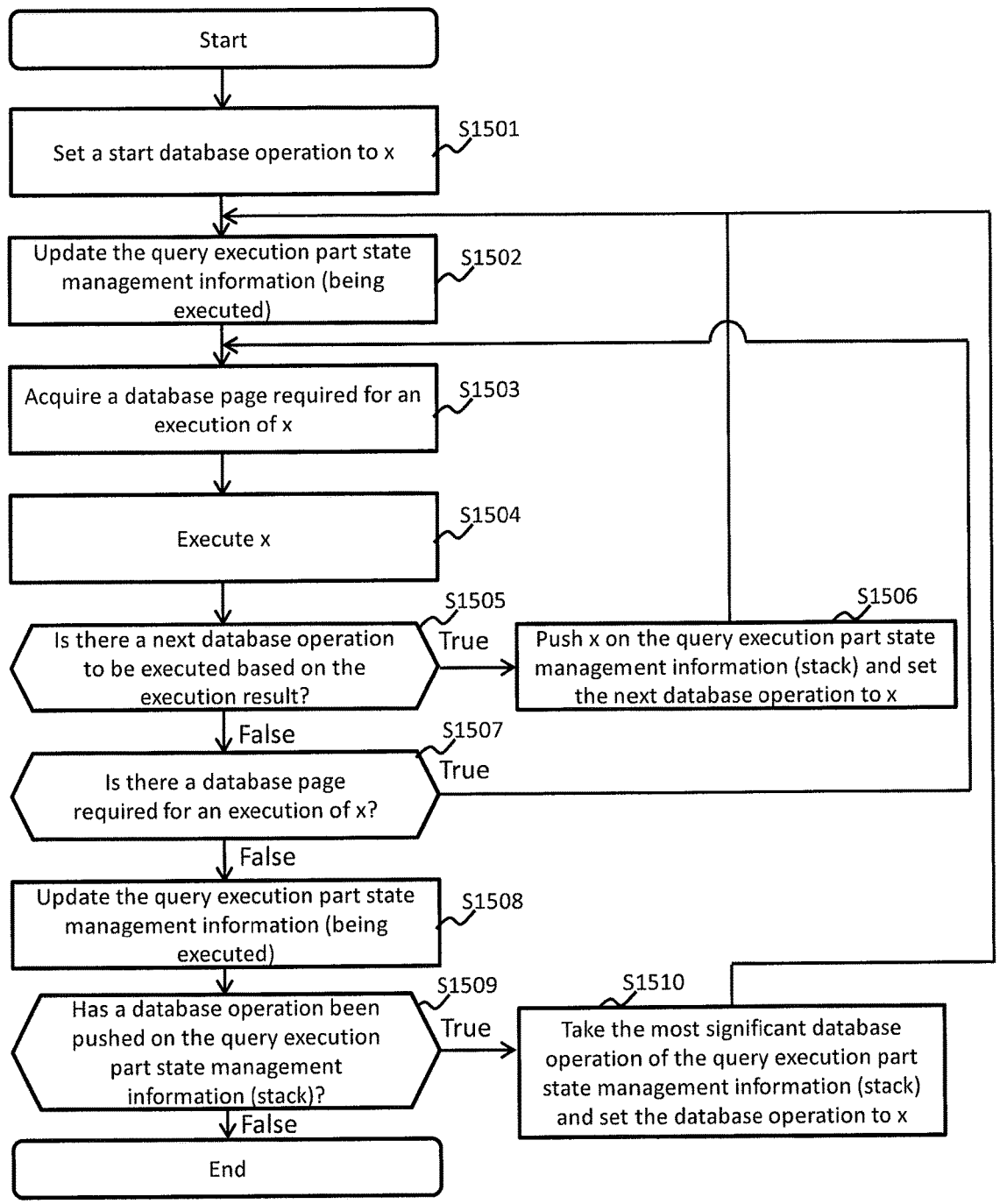
FIG. 15 is a view showing a first query execution procedure in accordance with Embodiment 1.

FIG. 15 is a view showing a first query execution procedure in accordance with Embodiment 1. The first query execution procedure is corresponded to a procedure of the S1306 of FIG. 13.

In the S1501, the query execution part 424 refers to the query execution plan information 423 and sets a start database operation to x (a local variable on the memory 416).

Subsequently in the S1502, the query execution part 424 reflects x to the executing database operation table 1002 of the query execution part state management information 425.

Subsequently in the S1503, the query execution part 424 acquires a database page required for an execution of x from the database 451. In this case, the query execution part 424 issues a read request of the database page to the database buffer management part 432. In the case where the database page has already been stored into the database buffer 551, the database buffer management part 432 returns the stored database page from the database buffer 551 to the query execution part 424. In the case where the database page has not been stored into the database buffer 551, the database buffer management part 432 issues a read request to the external storage apparatus 402 in which the database 451 has been stored, stores the database page that has been read from the database 451 into the database buffer 551, and returns the database page to the query execution part 424. In this case, in the present embodiment, for a first query execution procedure that is issued by the query execution part 424, a database page required for an execution of a database operation has already been stored into the database buffer 551 by a second query execution procedure that is issued by the acceleration part 428 in some cases. In the case where a database page is not required for an execution of x, it is not necessary to execute the procedure of the S1503.

Subsequently in the S1504, the query execution part 424 executes x. In this case, it is also possible to use a database page that has been read in the S1503.

In the S1505, the query execution part 424 further refers to the query execution plan information 423 and determines whether or not there is a next database operation to be executed based on the execution result of x that has been executed in the S1504. In the case where the result of the determination is positive, the S1506 is executed. In the case where the result of the determination is negative, the S1507 is executed.

In the S1506, the query execution part 424 saves the database operation that has been set to x to the stacking database operation table 1002 of the query execution part state management information 425, newly sets the next database operation to be executed to x, and executes the S1502.

In the S1507, the query execution part 424 determines whether or not there is a database page that is required for an execution of x and that is unread in the database 451. In the case where the result of the determination is positive, the S1503 is executed. In the case where the result of the determination is negative, the S1508 is executed.

In the S1508, the query execution part 424 erases x from the executing database operation table of the query execution part state management information 425.

Subsequently in the S1509, the query execution part 424 refers to the stacking database operation table 1002 of the query execution part state management information 425 and determines whether or not a database operation to be executed has been stacked. In the case where the result of the determination is positive, the S1510 is executed. In the case where the result of the determination is negative, the first query execution procedure for the query execution part 424 is terminated.

In the S1510, the query execution part 424 takes the most significant (a stack depth value is largest) database operation from the stacking database operation table 1002 of the query execution part state management information 425, sets the database operation to x, and executes the S1502.

An execution of a query by the query execution part 424 from the S1501 to the S1510 will be described in the following with reference to FIG. 7 for example.

(01) The query execution part 424 starts an execution of the database operation OP1 for retrieving the Part index based on the index condition 1=130.
(02) The query execution part 424 obtains a reference to a record |130|id131| of the first Part Table that satisfies the index condition 1=130 by an execution of the database operation OP1.
(03) The query execution part 424 starts an execution of the database operation OP2 for acquiring a record from the Part Table based on a reference to a record |130|id131| of the Part Table.
(04) The query execution part 424 acquires a record |130|id131| from the Part Table by an execution of the database operation OP2.
(05) The query execution part 424 starts an execution of the database operation OP3 for retrieving the Lineitem index based on the index condition c3=id131 based on the record that has been acquired from the Part Table.
(06) The query execution part 424 obtains a reference to a record |id131|D| of the first Lineitem Table that satisfies the index condition c3=id131 by an execution of the database operation OP3.
(07) The query execution part 424 starts an execution of the database operation OP4 for acquiring a record from the Lineitem Table based on a reference to a record |id131|D| of the Lineitem Table.
(08) The query execution part 424 acquires a record |id131|D| from the Lineitem Table by an execution of the database operation OP4.
(09) The query execution part 424 starts an execution of the database operation OP5 for creating a result record.
(10) The query execution part 424 outputs a result record |130|D| by an execution of the database operation OP5.
(11) The query execution part 424 obtains a reference to a record |id131|E| of the second Lineitem Table that satisfies the index condition c3=id131 by an execution of the database operation OP3.
(12) The query execution part 424 starts an execution of the database operation OP4 for acquiring a record from the Lineitem Table based on a reference to a record |id131|E| of the Lineitem Table.
(13) The query execution part 424 acquires a record |id131|E| from the Lineitem Table by an execution of the database operation OP4.
(14) The query execution part 424 starts an execution of the database operation OP5 for creating a result record.
(15) The query execution part 424 outputs a result record |130|D| by an execution of the database operation OP5.

After that, the query execution part 424 proceeds with an execution of a query similarly. In the above descriptions, the procedures of (01) and (02) are corresponded to the execution instance (#1) shown in FIG. 7, the procedures of (03) and (04) are corresponded to the execution instance (#2), the procedures of (05) and (06) are corresponded to the execution instance (#3), the procedures of (07) and (08) are corresponded to the execution instance (#4), the procedures of (09) and (10) are corresponded to the execution instance (#5), the procedure of (11) is corresponded to the execution instance (#6), the procedures of (12) and (13) are corresponded to the execution instance (#7), and the procedures of (14) and (15) are corresponded to the execution instance (#8).

Figure 16:
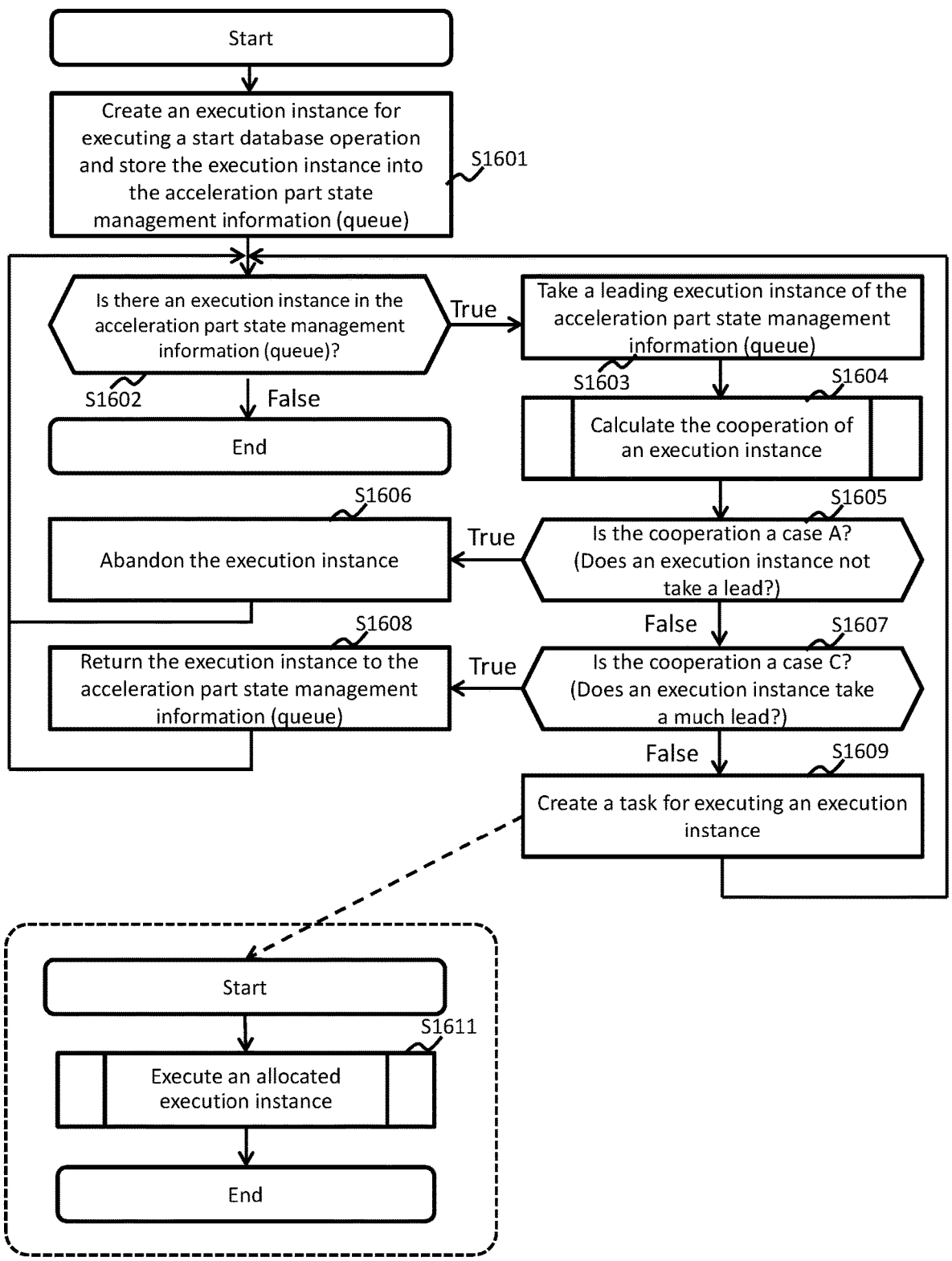
FIG. 16 is a view showing a flow of a second query execution procedure in accordance with Embodiment 1.

FIG. 16 is a view showing a second query execution procedure in accordance with Embodiment 1. The second query execution procedure is corresponded to a procedure of the S1312 of FIG. 13.

In the S1601, the acceleration part 428 refers to the query execution plan information 423, creates an execution instance for executing a first database operation, and stores the execution instance into the queuing execution instance table 1102 (queue) of the acceleration part state management information 429. For example, the acceleration part 428 can refer to the query execution plan information 423 and create an execution instance for executing a database operation that is indicated by the start database operation ID 811.

Subsequently in the S1602, the acceleration part 428 determines whether or not the queuing execution instance table 1102 is empty. In the case where the result of the determination is positive, the acceleration part 428 terminates the second query execution procedure. In the case where the result of the determination is negative, the acceleration part 428 executes the S1603.

In the S1603, the acceleration part 428 takes an execution instance from the queuing execution instance table 1102.

In the S1604, the acceleration part 428 executes a procedure for calculating the cooperation of an execution instance described later and calculates the cooperation of an execution instance that has been taken in the S1603. Here, the cooperation can mean that a time required for an execution of a query that is executed by the first query execution procedure that is executed by the query execution part 424 can be shortened by an execution of the execution instance by the acceleration part 428 in parallel.

Subsequently in the S1605, the acceleration part 428 determines whether or not the cooperation that has been calculated in the S1604 is a case A. In the case where the result of the determination is positive, the acceleration part 428 executes the S1606. In the case where the result of the determination is negative, the acceleration part 428 executes the S1607.

In the S1606, the acceleration part 428 does not execute an execution instance that has been taken in the S1603, abandons the execution instance, and executes the S1602.

In the S1607, the acceleration part 428 determines whether or not the cooperation that has been calculated in the S1604 is a case C. In the case where the result of the determination is positive, the acceleration part 428 executes the S1608. In the case where the result of the determination is negative, the acceleration part 428 executes the S1609.

In the S1608, the acceleration part 428 does not execute an execution instance that has been taken in the S1603, returns the execution instance to the queuing execution instance table 1102, and executes the S1602.

In the S1609, the acceleration part 428 creates a task for executing an execution instance that has been taken in the S1603. The task is created and executed by the processor 414. By this configuration, the acceleration part 428 executes the S1611 for every task.

In the S1611, the acceleration part 428 executes a procedure for executing an execution instance described later for the task that has been created in the S1609. By this configuration, a database operation that is corresponded to an execution instance is executed.

In accordance with the present embodiment, the processor 414 can execute a plurality of tasks in parallel. For a task that has been created and executed in the S1609, an execution instance is executed as shown in the S1611, whereby a database operation is executed. A database page that has been read from a database in the case where a database operation is executed is stored into the database buffer 551 in some cases. By this configuration, in the case where the query execution part 424 executes the first query execution procedure, there is a possibility of that a database page can be read from the database buffer 551 without newly reading a database page from a database. By this configuration, there is a possibility of that a time required for an execution of a query by the query execution part 424 can be shortened.

Figure 17:
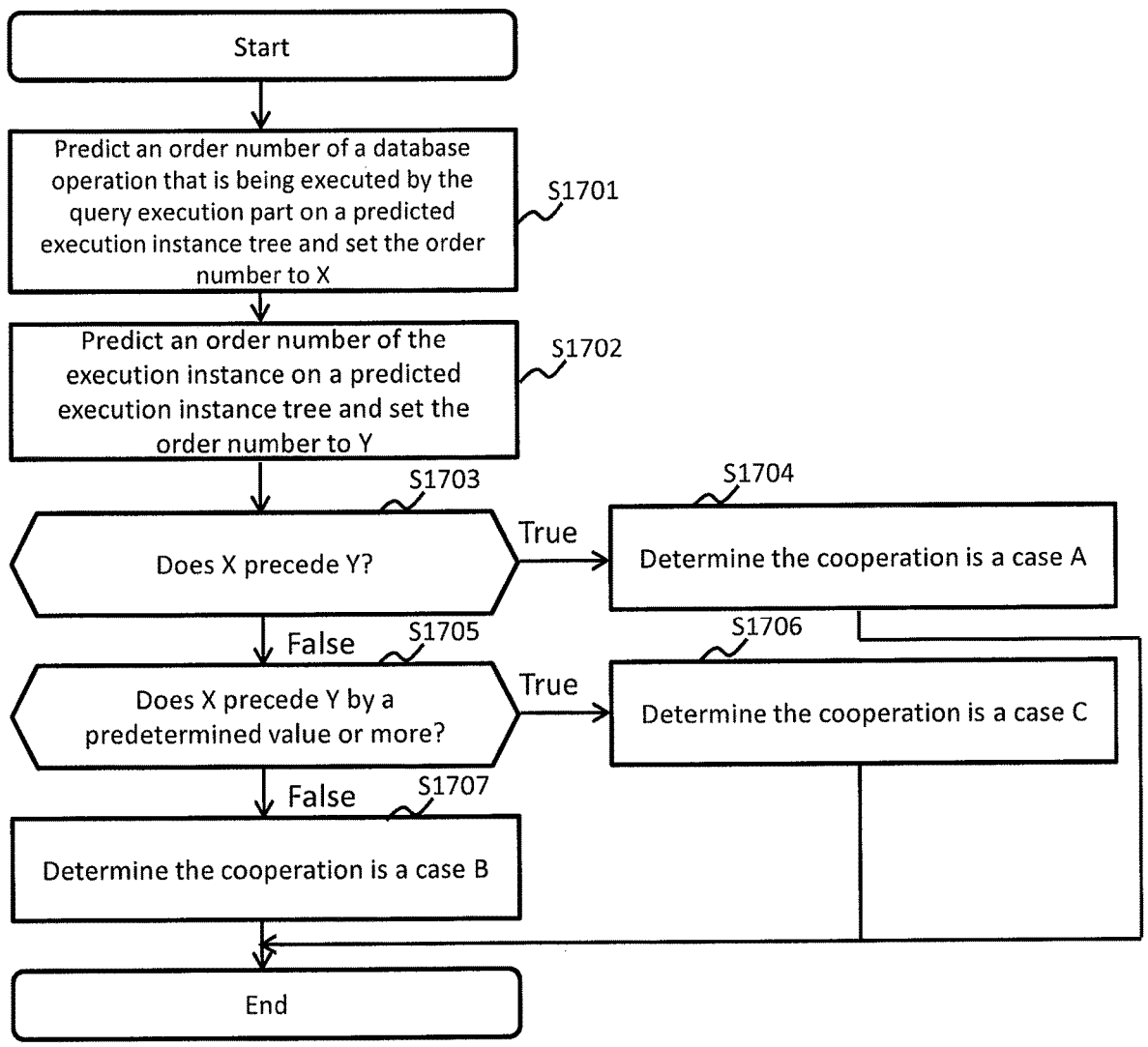
FIG. 17 is a view showing a procedure for calculating a cooperation of an execution instance in accordance with Embodiment 1.

FIG. 17 is a view showing a procedure for calculating a cooperation of an execution instance in accordance with Embodiment 1. The procedure for calculating a cooperation of an execution instance is corresponded to a procedure of the S1604 of FIG. 16.

In the S1701, the acceleration part 428 identifies a predicted order number for a predicted execution instance tree to which an execution of a database operation that is being executed at the moment by the query execution part 424 is corresponded, and sets the predicted order number to X (a local variable on the memory 416). More specifically, the acceleration part 428 refers to the query execution part state management information 425, acquires information related to an execution of a database operation that is being executed at the moment by the query execution part 424 and an execution of a database operation that is stacked, refers further to the cooperation control information 431, and identifies a predicted execution instance on a predicted execution instance tree that is thought to approximate an execution of a database operation that is being executed at the moment by the query execution part 424. In accordance with the illustration of an example of FIG. 10 for example, it is clarified that a database operation OP2 is created as the second child database operation by a database operation OP1 at first, and a database operation OP3 that is being executed at the moment is created as a first database operation OP3 of the database operation OP2. By using the development of a creation as described above, for the predicted execution instance tree shown in FIG. 12, it is clarified that a predicted execution instance ##1 is created at first, ##8 is created as the second child predicted execution instance, and ##9 is created as the first child predicted execution instance. That is, it is clarified that a database operation that is being executed at the moment by the query execution part 424 in FIG. 10 is corresponded to the predicted execution instance ##9 on a predicted execution instance tree in FIG. 12, and the predicted order number is 9. In the case where a predicted execution instance that is corresponded to a database operation that is being executed at the moment by the query execution part 424 does not exist on a predicted execution instance tree, a predicted order number of an adjacent predicted execution instance (that is the closest parent for example) can be configured as a predicted order number of the database operation.

Subsequently in the S1702, the acceleration part 428 identifies a predicted order number for a predicted execution instance tree to which an execution instance that is going to be executed by the acceleration part 428 is corresponded, and sets the predicted order number to Y (a local variable on the memory 416). More specifically, the acceleration part 428 refers to the acceleration part state management information 429, acquires information related to an execution instance that is going to be executed by the acceleration part 428 and an execution instance that has been executed by the acceleration part 428, refers further to the cooperation control information 431, and identifies a predicted execution instance on a predicted execution instance tree that is thought to approximate an execution instance that is going to be executed by the acceleration part 428. In accordance with the illustration of an example of FIG. 11 for example, it is clarified that an execution instance #8 is created as the second child execution instance by an execution instance #1 at first, an execution instance #9 is created as a first execution instance of the execution instance #8, and an execution instance #10 that is being executed at the moment is created as a first execution instance of the execution instance #9. By using the development of a creation as described above, for the predicted execution instance tree shown in FIG. 12, it is clarified that a predicted execution instance ##1 is created at first, ##8 is created as the second child predicted execution instance, ##9 is created as the first child predicted execution instance, and ##10 is further created as the first child predicted execution instance. That is, it is clarified that an execution instance #10 that is going to be executed by the acceleration part 428 in FIG. 11 is corresponded to the predicted execution instance ##9 on a predicted execution instance tree in FIG. 12, and the predicted order number is 10. In the case where a predicted execution instance that is corresponded to an execution instance that is being executed at the moment does not exist on a predicted execution instance tree, a predicted order number of an adjacent predicted execution instance (that is the closest parent for example) can be configured as a predicted order number of the execution instance.

Subsequently in the S1703 and the S1705, the acceleration part 428 determines a precedence relationship between X and Y.

In the case where a database page required for an execution of a database operation has already been read from the database 451 and stored into the database butter 551 by the second query execution procedure by the acceleration part 428 for the first query execution procedure by the query execution part 424 for example, the query execution part 424 can read a database page from the database butter 551 without newly reading a database page from the database butter 551, whereby it is expected that an effect of shortening a time required for an execution of a query is improved. In order to expect the effect, it is necessary that an execution of a database operation that is corresponded to the same execution instance is executed for the second query execution procedure by the acceleration part 428 before being executed for the first query execution procedure by the query execution part 424 for example. In other words, it is preferable that the second query execution procedure by the acceleration part 428 precedes the first query execution procedure by the query execution part 424 to shorten a time required for an execution of a query. On the other hand, in the case where an execution of a database operation that is corresponded to the same execution instance is executed for the second query execution procedure by the acceleration part 428 and then the execution of a database operation is executed for the first query execution procedure by the query execution part 424 a substantial amount of time later for example, although a database page required for an execution of the database operation for the second query execution procedure by the acceleration part 428 is stored into the database butter 551, in the case where the first query execution procedure by the query execution part 424 requires the database page, the database page has been evicted from database butter 551 by the database buffer management part 432, and there is a possibility of that an effect of shortening a time required for an execution of a query does not occur. That is, it is preferable that a degree of a precedence of the second query execution procedure by the acceleration part 428 to the first query execution procedure by the query execution part 424 is within a certain range to shorten a time required for an execution of a query.

In view of the above configuration, in the case of focusing attention on an execution of a database operation that is corresponded to each execution instance, it is preferable that an execution of the database operation for the second query execution procedure by the acceleration part 428 precedes an execution of the database operation for the first query execution procedure by the query execution part 424 and however a degree of the precedence is within a certain range to shorten a time required for an execution of a query.

More specifically in the S1703, the acceleration part 428 determines whether or not X precedes Y. In the case where the result of the determination is positive, the acceleration part 428 executes the S1704. In the case where the result of the determination is negative, the acceleration part 428 executes the S1705.

Subsequently in the S1704, the acceleration part 428 determines the cooperation is a case A, and terminates a procedure of calculating the cooperation of an execution instance. That is, the case A represents that a database operation that is being executed at the moment by the query execution part 424 precedes an execution instance that is going to be executed by the acceleration part 428 on the predicted execution instance tree. In this case, an effect of shortening a time required for an execution of a query by the query execution part 424 by executing an execution instance that is going to be executed by the acceleration part 428 cannot be expected.

In the S1705, the acceleration part 428 determines whether or not a degree of a precedence of Y to X is equal to or larger than a predetermined value. In the case where the result of the determination is positive, the acceleration part 428 executes the S1706. In the case where the result of the determination is negative, the acceleration part 428 executes the S1707.

Subsequently in the S1706, the acceleration part 428 determines the cooperation is a case C, and terminates a procedure of calculating the cooperation of an execution instance. That is, the case C represents that an execution instance that is going to be executed by the acceleration part 428 precedes a database operation that is being executed at the moment by the query execution part 424 by a predetermined value or more on the predicted execution instance tree. In this case, an effect of shortening a time required for an execution of a query by the query execution part 424 by executing an execution instance that is going to be executed by the acceleration part 428 cannot be expected.

Subsequently in the S1707, the acceleration part 428 determines the cooperation is a case B, and terminates a procedure of calculating the cooperation of an execution instance. That is, the case B represents that an execution instance that is going to be executed by the acceleration part 428 precedes a database operation that is being executed at the moment by the query execution part 424 by less than a predetermined value on the predicted execution instance tree. In this case, an effect of shortening a time required for an execution of a query by the query execution part 424 by executing an execution instance that is going to be executed by the acceleration part 428 can be expected in some cases.

For the boundary of a separation related to the above determination of a degree of a precedence of X and Y (such as a case of Y=X), a determination can be executed according to any case adjoining the boundary.

Regardless of the above procedure, in the case where a predetermined condition is satisfied, it is also possible to determine that the cooperation of an execution instance is a case B. The predetermined condition can be whether or not an execution instance is within a certain range of an execution of the execution instances of a predetermined number immediately after an execution of a query is started. Or, the predetermined condition can be whether or not an execution instance is within a certain range of a child execution instance in a predetermined generation from a start predicted execution instance on a predicted execution instance tree. Or, the predetermined condition can be whether or not a database operation in accordance with an execution instance is within a certain range of a child database operation in a predetermined generation from a start database operation on a query execution plan prediction. Moreover, the predetermined condition can be determined based on a value such as a configuration parameter of the database management system 412. For example, it can be determined whether or not a predetermined condition is satisfied based on the configuration information that has been stored into storage (such as the storage apparatus 415 and the external storage apparatus 402) that can be referred to from the database management system 412.

In the above procedure, an attention is focused on an order relationship on a predicted execution instance tree simply and the cooperation is determined according to a degree of precedence. As substitute for or in addition to the configuration, the acceleration part 428 can consider an amount of a database page required for an execution of a database operation for an execution instance. More specifically, in the S1705, the acceleration part 428 can predict an amount of a database page required for an execution of all predicted execution instances from a predicted execution instance that is corresponded to a database operation that is being executed by the query execution part 424 to a predicted execution instance that is corresponded to an execution instance that is going to be executed by the acceleration part 428, and determine whether or not the amount is equal to or larger than a predetermined value. In the case where the result of the determination is positive, the acceleration part 428 can determine that the cooperation is a case C. In the case where the result of the determination is negative, the acceleration part 428 can determine that the cooperation is a case B. In this case, an amount of a database page can be a capacity required for storing the database page on the database buffer 551 (such as the number of database pages) in addition to an amount of a database page required for an execution of a database operation. Here, a predetermined value can be a value of a capacity that is available at the point of time for the database buffer 551.

In the above procedure in accordance with the S1701 and the S1702, every when the cooperation of an execution instance is calculated, a predicted order number is calculated. As substitute for the configuration, in the case where the acceleration part 428 updates the acceleration part state management information 429 in the procedure shown in FIG. 16, the acceleration part 428 can calculate a predicted order number in advance and store the number into the query execution part state management information 425 and the acceleration part state management information 429. In order to store the predicted order number, each of the query execution part state management information 425 and the acceleration part state management information 429 can be provided with a predicted order number as an attribute. In the present specification, the query execution part state management information 425 shown in FIG. 10 is not provided with a predicted order number and the acceleration part state management information 429 shown in FIG. 11 is provided with a predicted order number 1115 for readability.

In the above procedure in accordance with the S1701 and the S1702, a predicted execution instance for a predicted execution instance tree that is corresponded to an execution instance is identified, and the cooperation is calculated by a predicted order number of the predicted execution instance. In addition, the predicted order number can be corrected based on a difference between an execution instance tree and a predicted execution instance tree and then the cooperation can be calculated. In accordance with the illustration of an example of FIG. 7 for example, in the case where it is assumed that the execution instances #4 and #6 that are children of the execution instance #3 are not created and a predicted execution instance tree is created as illustrated with an example of FIG. 12, an execution instance that is corresponded to the execution instances #4 to #7 in FIG. 7 is not created and, an execution instance that is corresponded to the execution instance #8 in FIG. 7 is created as the execution instance #4 in which an order number is 4 under the assumption. Since a parent execution instance is #1 for the execution instance and sibling # is 2, a predicted execution instance that is corresponded to the execution instances is #8 by the above procedure, a predicted order number is calculated as 8, and the difference between an order number and a predicted order number is generated by a difference between an execution instance tree and a predicted execution instance tree. After a predicted order number of an execution instance is calculated, the difference is calculated by checking the acceleration part state management information 429 and the cooperation control information 431, a predicted order number is corrected based on the difference, and then the cooperation can be calculated.

Figure 18:
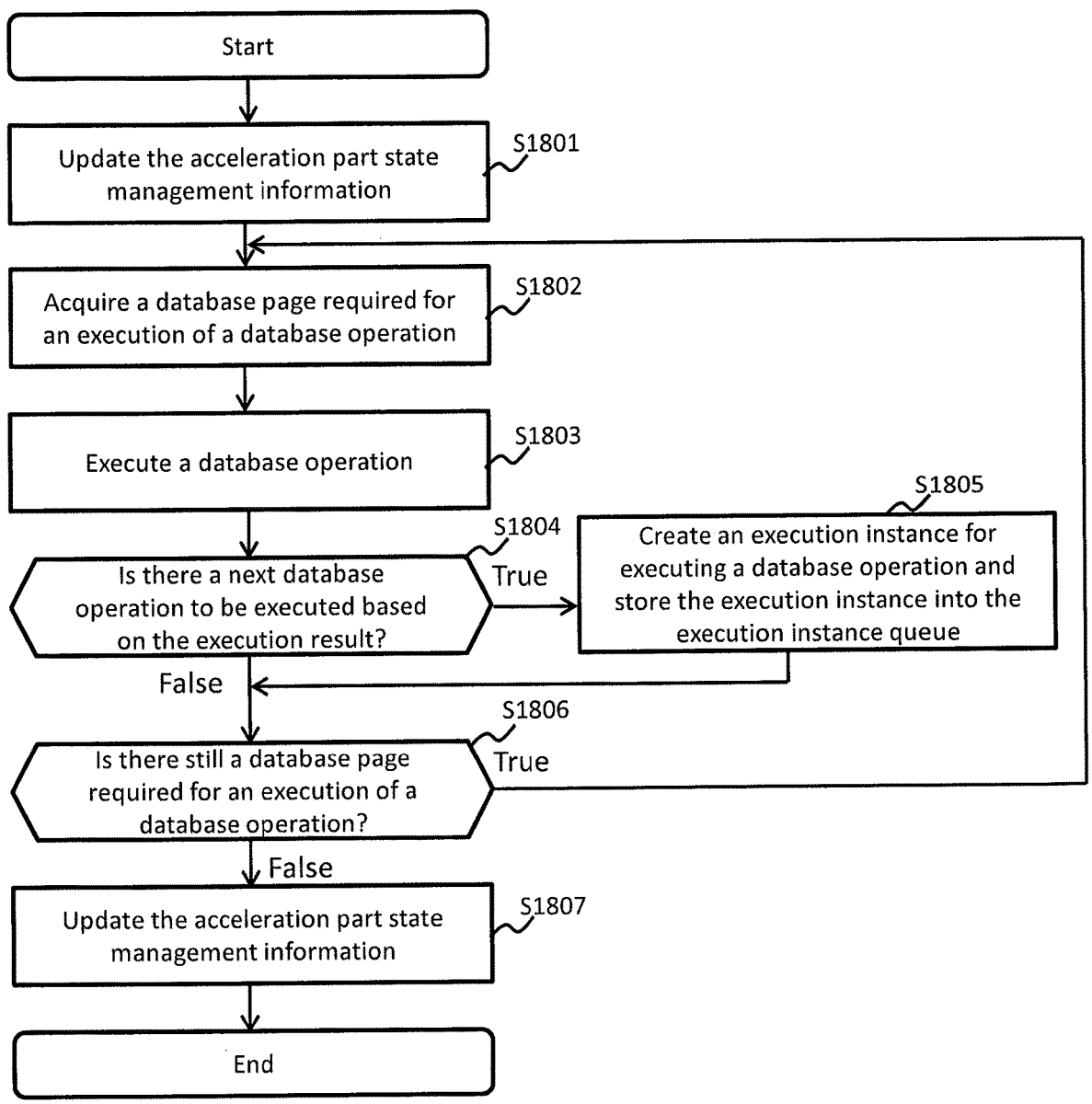
FIG. 18 is a view showing a procedure for executing an execution instance in accordance with Embodiment 1.

FIG. 18 is a view showing a procedure for executing an execution instance in accordance with Embodiment 1. The procedure for executing an execution instance is corresponded to a procedure of the S1611 of FIG. 16.

In the S1801, the acceleration part 428 stores an execution instance into the executing execution instance table 1101 of the acceleration part state management information 429.

Subsequently in the S1802, the acceleration part 428 reads a database page required for an execution of a database operation for an execution instance from a database. In this case, the acceleration part 428 issues a read request of the database page to the database buffer management part 432. In the case where the database page has already been stored into the database buffer 551, the database buffer management part 432 returns the stored database page to the query execution part 424. In the case where the database page has not been stored into the database buffer 551, the database buffer management part 432 issues a read request to the external storage apparatus 402 in which the database 451 has been stored, reads the database page from the database 451, and returns the database page to the query execution part 424. In this case, in the present embodiment, for a first query execution procedure that is issued by the query execution part 424, a database page that has already been stored into the database buffer 551 by a second query execution procedure that is issued by the acceleration part 428 can be used for an execution of a database operation in some cases. In the case where a database page is not required for an execution of a database operation for an execution instance, it is not necessary to execute the procedure of the S1802.

Subsequently in the S1803, the acceleration part 428 executes a database operation for an execution instance. In this case, the database page that has been acquired in the S1802 can be used.

Subsequently in the S1804, the acceleration part 428 further refers to the query execution plan information 423 and determines whether or not there is a next database operation to be executed based on the execution result of a database operation for an execution instance that has been executed in the S1803. In the case where the result of the determination is positive, the S1805 is executed. In the case where the result of the determination is negative, the S1806 is executed.

In the S1805, the acceleration part 428 creates an execution instance for executing a next database operation to be executed based on an execution result of a database operation for an execution instance that has been executed in the S1803, stores the execution instance into the queuing execution instance table 1102 of the acceleration part state management information 429, and executes the S1806. For example, in the case where it is necessary to execute a database operation for each different data based on an execution result of a database operation, the acceleration part 428 can create an execution instance for the each data. In this case, in the case where the acceleration part 428 creates a plurality of execution instances to store them, the acceleration part 428 can create the plurality of execution instances collectively and then store the execution instances into the queuing execution instance table 1102, or can store an execution instance into the queuing execution instance table 1102 every when creating the execution instance.

In the S1806, the acceleration part 428 determines whether or not there is a database page that is required for an execution of a database operation for an execution instance and that is unread. In the case where the result of the determination is positive, the acceleration part 428 executes the S1802. In the case where the result of the determination is negative, the acceleration part 428 executes the S1807.

In the S1807, the acceleration part 428 erases an execution instance from the executing execution instance table 1101 of the acceleration part state management information 429, and stores the execution instance into the executed execution instance table 1103 of the acceleration part state management information 429.

In the case where a procedure of an execution of an execution instance is completed here, an execution of a task is terminated as shown in the lower left drawing of FIG. 16. However, as substitute for the configuration, the procedures from the S1602 to the S1609 of FIG. 16 can be further executed recursively. In this case, the acceleration part 428 can directly execute the execution instance by a procedure that is corresponded to the S1611 without creating a task in the S1609.

In the next place, an effect in accordance with the present embodiment will be described. In the case where an execution instance that is executed by the acceleration part 428 is in a waiting state, the execution instance is stored into the queuing execution instance table 1102 as described above. In the case where an execution instance that is executed by the acceleration part 427 is being executed, the execution instance is stored into the executing execution instance table 1101. In the case where an execution instance that is executed by the acceleration part 427 has already been executed, the execution instance is stored into the executed execution instance table 1103. To avoid redundancy of descriptions, the description related to storing of an execution instance that is executed by the acceleration part 427 to the tables 1101 to 1103 is omitted in the following descriptions.

Figure 19:
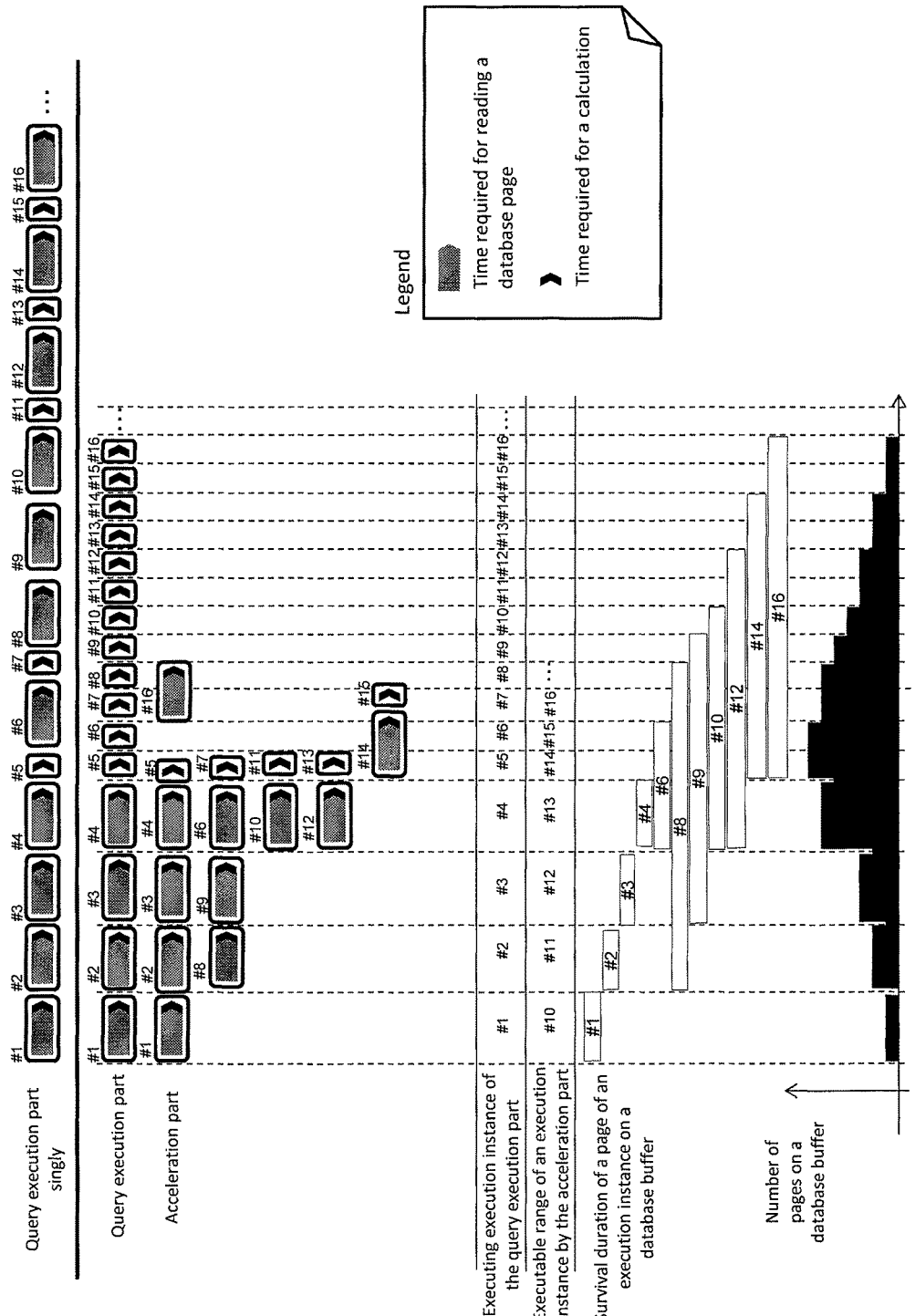
FIG. 19 is a time chart for illustrating an effect in accordance with Embodiment 1.

FIG. 19 is a time chart for illustrating an effect in accordance with Embodiment 1. FIG. 19 shows a time chart in the case where a part of an execution instance tree (execution instances (#1) to (#16)) shown in FIG. 9. In FIG. 19, a square having rounded corners indicates an execution instance, and a number on a square indicates an execution instance ID. Moreover, a pentagon in an execution instance indicates a time required for a read in the case where a database page that is required for an execution of a database operation that is corresponded to an execution instance is read, and a symbol in a > shape indicates a time required for a calculation for an execution instance. The maximum number of database pages (data) that can be stored into the database buffer 551 by the acceleration part 428 is 10. Consequently, so that the number of database pages that are stored into the database buffer 551 by the acceleration part 428 is equal to or less than 10, a range of an execution instance that can be executed by the acceleration part 428 is 10 execution instances that are executed after an execution instance that is executed by the query execution part 424 (including this execution instance).

In the case where the query execution part 424 singly executes a query, the query execution part 424 executes an execution instance in a predetermined order as shown in the upper drawing of FIG. 19. In the case where there is a database page that is required for an execution of a database operation that is corresponded to an execution instance, the query execution part 424 issues a read request of the database page to the database buffer management part 432 for each execution instance. The database buffer management part 432 reads the database page of the read request from the database 451 to store the database page into the database buffer 551, and returns the database page to the query execution part 424. The query execution part 424 receives the database page of the read request from the database buffer management part 432, and executes a calculation by using the database page. Consequently, for an execution instance for reading a new database page, it takes a relatively long time since a processing for reading a new database page from the database 451 occurs.

On the other hand, as described in Embodiment 1, in the case where the first query execution procedure by the query execution part 424 and the second query execution procedure by the acceleration part 428 are executed in parallel, as shown in the lower drawing of FIG. 19, it is expected that a time required for an execution of one query can be shortened as compared to the case in which the query execution part 424 singly executes a query processing. A specific example will be described in the following.

In the first place, in the case where a query is executed, an execution instance (#1) is executed by each of the query execution part 424 and the acceleration part 428. The each of the query execution part 424 and the acceleration part 428 issues a read request of a database page that is used for the execution instance (#1) to the database buffer management part 432. In the case where the database page of the read request has not been stored into the database buffer 551, the database buffer management part 432 reads the database page from the database, stores the database page that has been read into the database buffer 551, and returns the database page to the issuance source of the read request. By executing the execution instance (#1), the acceleration part 428 stores the execution instance (#1) into the executing execution instance table 1101, creates the execution instances (#2), (#8), (#16), (#22), . . . that are a child execution instance of the execution instance (#1), and stores the execution instances into a queue (the queuing execution instance table 1102).

In the case where the execution instance (#1) is terminated, the query execution part 424 executes the execution instance (#2). The query execution part 424 issues a read request of a database page required for an execution of the database operation that is corresponded to the execution instance (#2) to the database buffer management part 432 before or after the acceleration part 428. On the other hand, since the acceleration part 428 determines that 10 execution instances after the execution instance (#2) that is executed by the query execution part 424, that is, the execution instances (#2) to (#11) are provided with an acceleration effect, the acceleration part 428 executes the processing of the execution instances (#2) and (#8) that have been stored into the queue in parallel. The execution of the execution instances (#16), (#22), etc. is suspended. In the case where the acceleration part 428 executes the execution instances (#2), the acceleration part 428 creates the execution instance (#3) that is a child execution instance and stores the execution instance into the queue. In the case where the acceleration part 428 executes the execution instances (#8), the acceleration part 428 creates the execution instance (#9) that is a child execution instance and stores the execution instance into the queue.

In the case where the execution instance (#2) is terminated, the query execution part 424 executes the execution instance (#3). The query execution part 424 issues a read request of a database page required for an execution of the database operation that is corresponded to the execution instance (#3) to the database buffer management part 432 before or after the acceleration part 428. On the other hand, since the acceleration part 428 determines that 10 execution instances after the execution instance (#3) that is executed by the query execution part 424, that is, the execution instances (#3) to (#12) are provided with an acceleration effect, the acceleration part 428 executes the processing of the execution instances (#3) and (#9) that have been stored into the queue in parallel. In the case where the acceleration part 428 executes the execution instance (#3), the acceleration part 428 creates the execution instances (#4) and (#6) those are child execution instances and stores the execution instances into the queue. In the case where the acceleration part 428 executes the execution instance (#9), the acceleration part 428 creates the execution instances (#10), (#12), and (#14) that are a child execution instance and stores the execution instances into the queue.

In the case where the execution instance (#3) is terminated, the query execution part 424 executes the execution instance (#4). The query execution part 424 issues a read request of a database page required for an execution of the database operation that is corresponded to the execution instance (#4) to the database buffer management part 432 before or after the acceleration part 428. On the other hand, since the acceleration part 428 determines that 10 execution instances after the execution instance (#4) that is executed by the query execution part 424, that is, the execution instances (#4) to (#13) are provided with an acceleration effect, the acceleration part 428 executes the processing of the execution instances (#4), (#6), (#10), and (#12) that have been stored into the queue in parallel. In the case where the acceleration part 428 executes the execution instances (#4), (#6), (#10), and (#12), the acceleration part 428 creates the execution instances (#5), (#7), (#11), and (#13) that are a child execution instance and stores the execution instances into the queue.

In the case where the execution instance (#4) is terminated, the query execution part 424 executes the execution instance (#5). Since an access to the database 451 is not required for an execution of the execution instance (#5), the query execution part 424 can terminate a processing early. On the other hand, since the acceleration part 428 determines that 10 execution instances after the execution instance (#5) that is executed by the query execution part 424, that is, the execution instances (#5) to (#14) are provided with an acceleration effect, the acceleration part 428 executes the processing of the execution instances (#5), (#7), (#11), (#13), and (#14) that have been stored into the queue in parallel. For an execution of the execution instances (#5), (#7), (#11), and (#13), since an access to the database 451 is not required, a processing is terminated early. In the case where the acceleration part 428 executes the execution instance (#14), the acceleration part 428 creates the execution instance (#15) that is a child execution instance and stores the execution instance into the queue.

In the case where the execution instance (#5) is terminated, the query execution part 424 executes the execution instance (#6). The query execution part 424 issues a read request of a database page required for an execution of the database operation that is corresponded to the execution instance (#6) to the database buffer management part 432. However, since a read request of the database page has already been issued by the acceleration part 428, the database page has been stored into the database buffer 551. Consequently, the database buffer management part 432 can provide the database page to the query execution part 424 without issuing a read request of the database page to the database 451, and the query execution part 424 can execute the database operation that is corresponded to the execution instance (#6) by using the database page. Therefore, the query execution part 424 can terminate the execution instance (#6) early.

After the execution instance (#6) is terminated for the query execution part 424, the acceleration part 428 executes the execution instance (#16). After the execution instance (#14) is terminated, the acceleration part 428 executes the execution instance (#15).

After the execution instance (#6) is terminated, the query execution part 424 sequentially executes the execution instances (#7) to (#16) similarly after the last execution instance is terminated. In this case, since the database page that is used for the execution instances (#7) to (#16) that are executed has already been stored into the database buffer 551 by a read request from the acceleration part 428, the database buffer management part 432 provides the database page to the query execution part 424 without issuing a read request of the database page to the database 451. The query execution part 424 can receive the database page from the database buffer management part 432 and execute each of the execution instances (#7) to (#16) by using the database page. Therefore, the query execution part 424 can terminate the execution instances rapidly.

In accordance with Embodiment 1 as described above, there is a possibility of that the database page of a read request from the query execution part 424 to the database buffer management part 432 has already been read by a read request from the acceleration part 428 to the database buffer management part 432 and stored into the database buffer 551. Consequently, a time required for an execution of one query can be shortened as compared to the case in which the query execution part 424 singly executes a query processing.

Embodiment 2

Embodiment 2 will be described in the following. In this case, the points of difference from Embodiment 1 will be described mainly, and the descriptions of the common points with Embodiment 1 will be omitted or simplified.

The database buffer management part 432 decides a database page that is an eviction target of database pages (data) in the database buffer 551 based on the database buffer management information 550. This decision can be executed at arbitrary timing, for example, timing when the database buffer management part 432 detects that a free capacity of the database buffer 551 becomes less than a predetermined capacity.

FIG. 20 is a view showing a configuration of the database buffer management information 550 in accordance with Embodiment 2.

The database buffer management information 550 is provided with a database buffer management table 2001. The database buffer management table 2001 is provided with a record for every database page that has been stored into the database buffer 551, and is provided with a database page ID 2011, an access frequency 2012, an acceleration part store flag 2013, and a query execution part provision flag 2014 as attributes. The database page ID 2011 is an ID of a database page. The access frequency 2012 represents an access frequency (a reading frequency) to a database page. The acceleration part store flag 2013 indicates whether or not a database page is a database page that has been stored by the acceleration part 428. The query execution part provision flag 2014 indicates whether or not a database page has been provided from the database buffer 551 by a read request from the query execution part 424.

The database buffer management part 432 can know whether or not a database page of a read request from the query execution part 424 has already been stored into the database buffer 55 by a read request from the acceleration part 428 based on the database buffer management table 2001 in the database buffer management information 550. The database page is a database page of which the acceleration part store flag 2013 is "1" and the query execution part provision flag 2014 is "0". In the case where the database page is provided to the query execution part 424, the database buffer management part 432 updates the query execution part provision flag 2014 to the database page from "0" to "1".

Moreover, the database buffer management part 432 can decide a database page that is an eviction target of database pages in the database buffer 551 based on the database buffer management table 2001 in the database buffer management information 550.

As a first example, the database buffer management part 432 can decide a database page of which the query execution part provision flag 2014 is "1", that is, a database page that has already been provided to the query execution part 424 as an eviction target. In other words, the database buffer management part 432 does not decide a database page of which the acceleration part store flag 2013 is "1" and the query execution part provision flag 2014 is "0" as an eviction target.

As a second example, the database buffer management part 432 can decide an eviction target of a plurality of database pages based on a plurality of access frequencies 2022 that are corresponded to the plurality of database pages in the database buffer 551. In other words, the database buffer management part 432 can narrow down database pages made to be an eviction target due to the query execution part provision flag 2014 of "1" based on the access frequency 2022. For example, the database buffer management part 432 can decide only a database page of which the access frequency 2022 is relatively low for database pages of which the query execution part provision flag 2014 is "1" as an eviction target. By this configuration, since a database page of which the access frequency 2022 is relatively high remains in the database buffer 551, it is expected that an access frequency to the database 451 is lowered, whereby it is expected that a time required for an execution of one query is further shortened.

Embodiment 31

Embodiment 3 will be described in the following. In this case, the points of difference from Embodiment 1 and Embodiment 2 will be described mainly, and the descriptions of the common points with Embodiment 1 and Embodiment 2 will be omitted or simplified.

FIG. 21 is a view showing a configuration of the statistical information 427 in accordance with Embodiment 3.

The statistical information 427 can include a query specific statistical information table 2101 in addition to a general statistical information table 901. The query specific statistical information table 2101 includes information related to a Table 462 or an index 461 that is included in the database for an execution of a particular query to a database, for example, a maximum value, an average value, and a minimum value of a value for every column related to a record that satisfies a selection condition for an execution of a particular query, and a value distribution for every column for example.

The query specific statistical information table 2101 is provided with a record for every statistical item, and is provided with a Table 2111, a column 2112, and a statistical value 2113 as attributes. The Table 2111 indicates a Table related to a statistical item. The column 2112 indicates a column related to a statistical item. However, in the case where the statistical item is not related to a particular column, the column 2112 is "-". The statistical value 2113 indicates a specific value of a type of a statistic. In FIG. 21, a first statistical item represents that the number of records that satisfy a selection condition of c1=130 to a column c1 of the Part Table is 7. A second statistical item represents that 3 records of the Lineitem Table is corresponded to 1 record of the Part Table in the case where a join calculation by c2=c3 is executed for a column c2 of the Part Table and a column c3 of the Lineitem Table.

In the S1401 of FIG. 14, the cooperation control information creation part 430 can further create the cooperation control information 431 with reference to the query specific statistical information table 2101 that is included in the statistical information 427.

For example, the following describes an example of the query specific statistical information table 2101 of the query execution plan information 423 of FIG. 8 and the statistical information 427 of FIG. 21. The database operation OP1 executes the index retrieval of the Part Table under the condition of c1=130. In accordance with the statistical information 427, it is known that the number of records the Part Table that directly satisfies c1=130 is 7. That is, it is predicted that the database operation OP2 is executed to each of seven different inputs as a result of an execution of the database operation OP1. The database operation OP2 acquires a record based on a record reference. In this case, since one record is corresponded to one record reference, it is predicted that one database operation OP3 is executed as a result of an execution of each database operation OP2. The database operation OP3 knows that a join rate of the Lineitem Table under the join condition of c2=c3 is 3 based on a record that has been acquired from the Part Table, and three records are corresponded to a value of c3. Therefore, it is predicted that the database operation OP4 is executed to each of three different inputs as a result of an execution of each database operation OP3. The database operation OP4 acquires a record based on a record reference. In this case, since one record is corresponded to one record reference, it is predicted that one database operation OP5 is executed as a result of an execution of each database operation OP4. In the case where the statistical uniformity is assumed by the above procedure, the following execution instance tree is predicted.

The number of execution instances that are corresponded to the database operation OP1 is 1. This is the execution instance (a predicted execution instance) that is executed at first.

Seven execution instances are created from the execution instance (the database operation OP2 is executed). In other words, the number of execution instances that is corresponded to the database operation OP2 is 7.

One execution instance is created from each of the execution instance (the database operation OP3 is executed). In other words, the number of execution instances that is corresponded to the database operation OP3 is 7.

Three execution instances are created from each of the execution instance (the database operation OP4 is executed). In other words, the number of execution instances that is corresponded to the database operation OP4 is 21.

One execution instance is created from each of the execution instance (the database operation OP5 is executed). In other words, the number of execution instances that is corresponded to the database operation OP5 is 21.

Such a predicted execution instance tree is stored into the memory 416 by the configuration shown in FIG. 12. A predicted order number can be calculated by following a predicted execution instance based on an execution order of a query for the query execution part 424 starting with a start predicted execution instance on the predicted execution instance tree.

In accordance with Embodiment 3, the statistical information 427 includes the specific statistical information table 2101 for a query, and a predicted order number for a predicted execution instance is calculated based on the table 2101. By this configuration, it is expected that accuracy of a prediction of an order number is improved, whereby it is further expected that a time required for an execution of one query is shortened.

Embodiment 4

Embodiment 4 will be described in the following. In this case, the points of difference from Embodiment 1 to Embodiment 3 will be described mainly, and the descriptions of the common points with Embodiment 1 to Embodiment 3 will be omitted or simplified.

Figure 22:
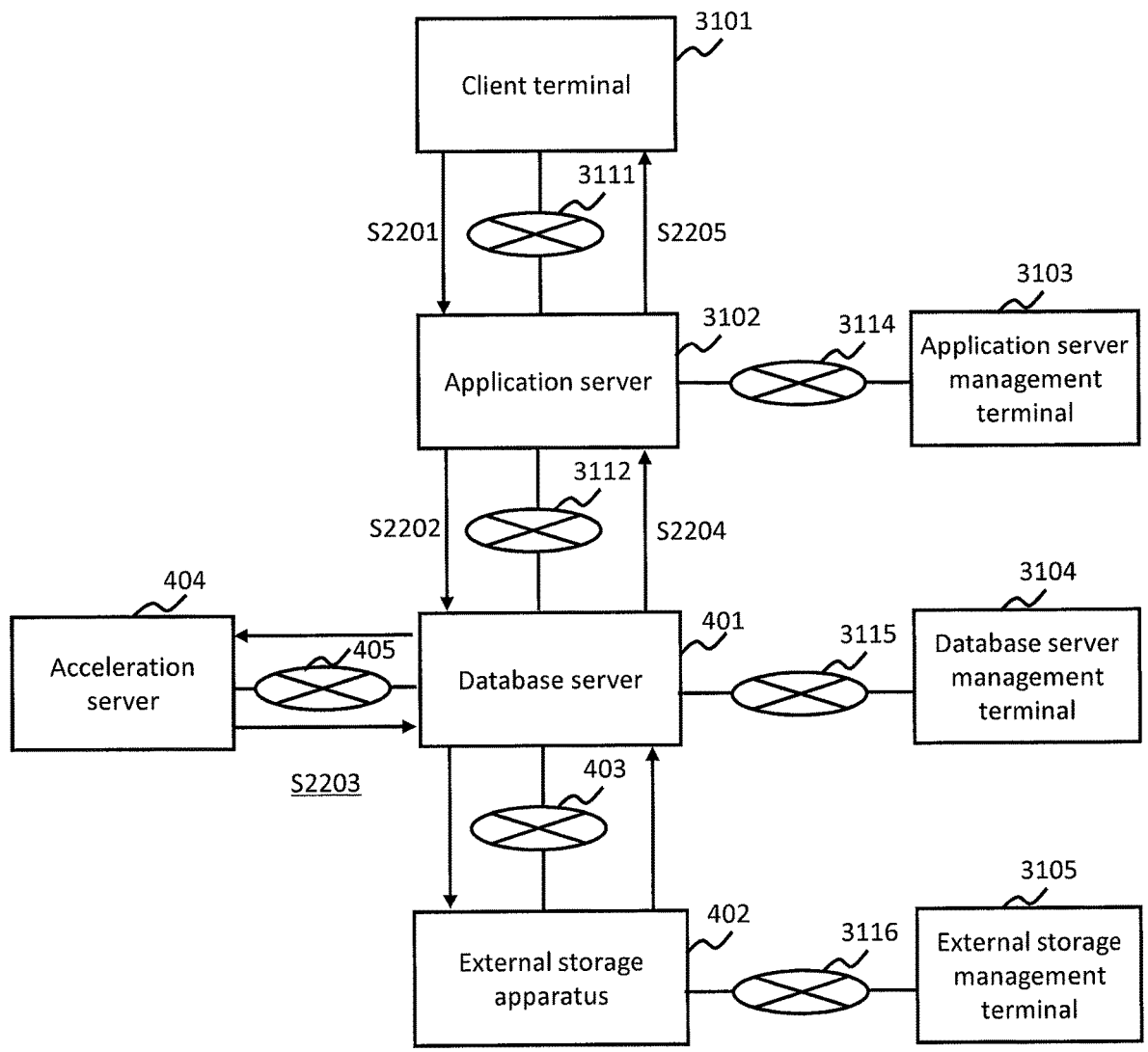
FIG. 22 is a view showing a configuration of a computer system in accordance with Embodiment 4.

FIG. 22 is a view showing a configuration of a computer system in accordance with Embodiment 4.

An application server 3102 is coupled to a database server 401 via a communication network 3112 in a communicated manner. Moreover, an external storage apparatus 402 is coupled via a communication network 403 in a communicated manner. A client terminal 3101 is coupled to the application server 3102 via a communication network 3111 in a communicated manner. Moreover, an acceleration server 404 is coupled to the database server 401 via a communication network 405 in a communicated manner. The database server 401 executes a database management system that manages a database. A database management system of the database server 401 can be the database management system 412 of Embodiment 1 from which the acceleration part 428, the acceleration part effectiveness determination part 426, and the cooperation control information creation part 430 are removed for example. The acceleration server 404 is a server that is provided with the acceleration part 428, the acceleration part effectiveness determination part 426, and the cooperation control information creation part 430 of Embodiment 1 for example. The external storage apparatus 402 stores the database 451. The application server 3102 executes an application that issues a query to a database management system that is executed by the database server 401. The client terminal 3101 sends a request an application that is executed by the application server 3102. A plurality of the client terminals 3101 or the application servers 3102 can exist.

An application server management terminal 3103, a database server management terminal 3104, and a storage management terminal 3105 are coupled to the application server 3102, the database server 401, and the external storage apparatus 402 via a communication network 3114, a communication network 3115, and a communication network 3116, respectively. The application server management terminal 3103 is a terminal that manages the application server 3102, the database server management terminal 3104 is a terminal that manages the database server 401, and the storage management terminal 3105 is a terminal that manages the external storage apparatus 402. At least two of the management terminals 3103 to 3105 can be in common (integrated). At least two of the communication networks 3111 to 3116 can be in common (integrated).

In Embodiment 4, a flow of the following processing can be executed:

(S2201) The application server 3102 receives a request (hereafter referred to as a client request) from the client terminal 3101.

(S2202) The application server 3102 creates a query in accordance with the client request that has been received in the S2201 and issues the created query to the database server 401.

(S2203) The database server 401 receives the query from the application server 3102 and creates a query execution plan. The query execution part 424 of the database server 401 and the acceleration part 428 of the acceleration server 404 execute the processing described before based on the query execution plan. In the processing, a database page that is required for the database server 401 has already been stored into the database buffer 551 by a read request of the acceleration server 404 in some cases. Consequently, a frequency of an access of the database server 401 to the external storage apparatus 402 is decreased, whereby it is expected that a time required for an execution of one query is shortened.

(S2204) The database server 401 transmits an execution result of the query to the application server 3102.

(S2205) The application server 3102 receives the execution result of the query and transmits a response subjected to the execution result to the client request that has been received in the S2201 to the client terminal 3101.

A plurality of the client requests to the application server 3102 or a plurality of queries that are issued to the database server 401 can exist simultaneously.

In accordance with Embodiment 4, by configuring the acceleration server 404 separately from the database server 401 that is provided with an existing database management system, it is expected that a time required for an execution of one query for the database server 401 is shortened.

While some embodiments in accordance with the present invention have been described above, the present invention is not restricted to the above embodiments, and it is obvious that various changes and modifications can be thus made without departing from the scope of the present invention.

For example, the present invention can be applied to a data input/output other than an input/output (such as a data read) to a database by the database management system, such as an input/output to a file by a file system. Such a computer system can be provided with a processing request reception part for receiving a processing request from a processing request issuance source, a first processing request executing part for executing the processing request by executing an operation based on the processing request and for returning an execution result of the processing request to the processing request issuance source, a second processing request executing part for executing the processing request by executing an operation based on the processing request, and a buffer management part for reading data of a read request from storage to store into a buffer and for providing the data of a read request to a processing request executing part of an issuance source of the read request of the first processing request executing part and the second processing request executing part in the case where a read request of data is received from any one of the first processing request executing part and the second processing request executing part and data of the read request has not been stored in a buffer. In the case where an issuance source of the read request is the first processing request executing part and data of a read request has already been read-requested from the second processing request executing part and stored in the buffer, the buffer management part reads the data of a read request from the buffer and provides the data to the first processing request executing part. As described above, a computer system that is expected to be applied to a field other than a database can be expected to be implemented by rereading a database operation as an operation and a query as a processing request in the above descriptions.

REFERENCE SIGNS LIST

412: Database management system

The invention claimed is:

1. A database management system for managing a database, comprising:
   a query reception part configured to receive a query to the database from a query issuance source;
   a query execution plan creation part configured to create a query execution plan that includes information indicating one or more database operations that are required for an execution of the received query and an execution procedure of the one or more database operations based on the received query;
   a first query execution part configured to execute the query by executing database operations based on the created query execution plan and to return an execution result of the query to the query issuance source;
   a second query execution part configured to execute the query by executing database operations based on the created query execution plan in parallel with the execution of the query by the first query execution part; and
   a buffer management part configured to read data of a read request from the database to store the data into the buffer and to provide the data of the read request to whichever one of the first and second query execution parts issued the read request if the data of the read request has not already been stored in the buffer,
      the buffer management part being configured to, if the data has already been stored in the buffer based on a read request for the data from the second query execution part, in response to a read request for the data from the first query execution part, read the data of the read request from the buffer and provide the data to the first query execution part without reading the data from the database,
   wherein, for the execution of the query, the second query execution part is configured to:
   (a) create an execution instance for executing a database operation;
   (b) send a read request of data required for an execution of a database operation corresponding to the execution instance to the buffer management part by executing the created execution instance;
   (c) in the case where it is necessary to execute another database operation based on an execution result of the database operation corresponding to the execution instance that has been executed in (b), newly create one or more execution instances for executing the another database operation based on the execution result; and
   (d) execute (b) and (c) for each of the one or more execution instances that have been newly created, and
   wherein the second query execution part is configured to execute at least two execution instances in parallel.

2. The database management system according to claim 1, wherein the second query execution part is configured to decide an execution instance to postpone an execution among the at least two execution instances that are executed in parallel based on a situation of a query execution by the first query execution part.

3. The database management system according to claim 2, wherein the second query execution part is configured to decide an execution instance to abandon an execution among the at least two execution instances that are executed in parallel based on the situation of a query execution by the first query execution part.

4. The database management system according to claim 2, further comprising:
   a control information creation part configured to create control information based on the created query execution plan,
   wherein the situation of a query execution by the first query execution part is a first predicted order number of a database operation that is executed by the first query execution part, which is obtained based on the control information, and
   wherein the second query execution part is configured to decide an execution instance to postpone an execution among the at least two execution instances that are executed in parallel based on a second predicted order number that is obtained based on the control information for the at least two execution instances that are executed in parallel and the first predicted order number of database operations respectively corresponding to the at least two execution instances that are executed in parallel.

5. The database management system according to claim 4, wherein the second query execution part is configured to decide an execution instance to postpone an execution among the at least two execution instances that are executed in parallel based on a capacity that can be used by the buffer.

6. The database management system according to claim 4, wherein the control information creation part is configured to update the control information based on information of at least one of an execution of a database operation by the first query execution part and an execution of a database operation by the second query execution part.

7. The database management system according to claim 4, wherein the control information creation part is configured to create the control information based on statistical information that is acquired from the query execution plan or the database.

8. The database management system according to claim 7, wherein the control information creation part is configured to create the control information based on query specific statistical information that is information of at least one of a record of a query execution for the first query execution part and a record of a query execution for the second query execution part.

9. The database management system according to claim 1,
wherein the second query execution part is configured to stop an execution of a query in the case where an execution of a query by the first query execution part is completed.

10. The database management system according to claim 1,
wherein the second query execution part is configured to execute the query in the case where a predetermined condition is satisfied and the second query execution part is configured to do not execute the query in the case where a predetermined condition is not satisfied.

11. The database management system according to claim 10,
wherein the predetermined condition is a predetermined condition for the query execution plan.

12. The database management system according to claim 10,
wherein the predetermined condition is a predetermined condition for an amount of resources that can be used for an execution of a query.

13. The database management system according to claim 10,
wherein the predetermined condition is determined based on a configuration parameter of the database management system.

14. The database management system according to claim 10,
wherein the predetermined condition is a predetermined condition for an instruction that is included in the query.

15. The database management system according to claim 1,
wherein the buffer management part is configured to manage buffer management information, for each data that has been stored in the buffer, for identifying whether or not there is data that has been stored in the buffer in response to a read request from the second query execution part and that has not been provided to the first query execution part, and
wherein the buffer management part is configured to decide data that is a target of an eviction from the buffer based on the buffer management information.

16. A computer system for managing a database, comprising:
a processor; and
a buffer,
the processor being configured to:
receive a query to the database from a query issuance source;
create a query execution plan that includes information indicating one or more database operations that are required for an execution of the received query and an execution procedure of the one or more database operations based on the received query;
execute a first query execution procedure for executing the query by executing database operations based on the created query execution plan;
execute a second query execution procedure for executing the query by executing database operations based on the created query execution plan in parallel with the execution of the first query execution procedure;
read the required data from the database to store the data into the buffer and use the required data in the query execution procedure that requires the required data for the first and second query executions in the case where data required for any one of the first query execution and the second query execution has not already been stored in the buffer;
if the required data has already been stored in the buffer by being required in the second query execution procedure, if the query first execution procedure requires the required data, read the required data from the buffer and use the data in the first query execution procedure; and
return a query execution result by the first query execution procedure of the first and second query executions to the query issuance source,
wherein, for the execution of the query, the second query execution procedure is configured to:
(a) create an execution instance for executing a database operation;
(b) send a read request of data required for an execution of a database operation corresponding to the execution instance to the buffer management part by executing the created execution instance;
(c) in the case where it is necessary to execute another database operation based on an execution result of the database operation corresponding to the execution instance that has been executed in (b), newly create one or more execution instances for executing the another database operation based on the execution result; and
(d) execute (b) and (c) for each of the one or more execution instances that have been newly created, and
wherein the second query execution part is configured to execute at least two execution instances in parallel.

17. A database management method for managing a database, comprising:
receiving a query to the database from a query issuance source;
creating a query execution plan that includes information indicating one or more database operations that are required for an execution of the received query and an execution procedure of the one or more database operations based on the received query;
executing a first query execution procedure for executing the query by executing database operations based on the created query execution plan;
executing a second query execution procedure for executing the query by executing database operations based on the created query execution plan in parallel with the executing of the first query execution procedure;
reading the required data from the database to store the data into the buffer and use the required data in the query execution procedure that requires the required data for the first and second query executions in the case where data required for any one of the first query execution and the second query execution has not already been stored in the buffer;
when the required data has already been stored in the buffer by being required in the second query execution procedure, and when the first query execution procedure requires the required data, reading the required data from the buffer and using the data in the first query execution procedure; and
returning a query execution result by the first query execution procedure of the first and second query executions to the query issuance source,
wherein, for the execution of the query, the second query execution procedure is configured to:
(a) create an execution instance for executing a database operation;
(b) send a read request of data required for an execution of a database operation corresponding to the execution instance to the buffer management part by executing the created execution instance;

(c) in the case where it is necessary to execute another database operation based on an execution result of the database operation corresponding to the execution instance that has been executed in (b), newly create one or more execution instances for executing the another database operation based on the execution result; and (d) execute (b) and (c) for each of the one or more execution instances that have been newly created, and wherein the second query execution part is configured to execute at least two execution instances in parallel.

18. A non-transitory computer readable storage medium comprising a computer program having instructions for supporting a database management system, the instructions being performed by at least one processor to configure:

a query reception part configured to receive a query to the database from a query issuance source;

a query execution plan creation part configured to create a query execution plan that includes information indicating one or more database operations that are required for an execution of the received query and an execution procedure of the one or more database operations based on the received query;

a first query execution part configured to execute the query by executing database operations based on the created query execution plan and to return an execution result of the query to the query issuance source;

a second query execution part configured to execute the query by executing database operations based on the created query execution plan in parallel with the execution of the query by the first query execution part; and a buffer management part configured to read data of a read request from the database to store the data into the buffer and to provide the data of the read request to whichever one of the first and second query execution parts issued the read request if the data of the read request has not already been stored in the buffer, the buffer management part being configured to, if the data has already been stored in the buffer based on a read request for the data from the second query execution part, in response to a read request for the data from the first query execution part, read the data of the read request from the buffer and provide the data to the first query execution part without reading the data from the database, wherein, for the execution of the query, the second query execution part is configured to:

(a) create an execution instance for executing a database operation;

(b) send a read request of data required for an execution of a database operation corresponding to the execution instance to the buffer management part by executing the created execution instance;

(c) in the case where it is necessary to execute another database operation based on an execution result of the database operation corresponding to the execution instance that has been executed in (b), newly create one or more execution instances for executing the another database operation based on the execution result; and (d) execute (b) and (c) for each of the one or more execution instances that have been newly created, and wherein the second query execution part is configured to execute at least two execution instances in parallel.

* * * * *